US011299644B2

(12) United States Patent
Fleischmann et al.

(10) Patent No.: US 11,299,644 B2
(45) Date of Patent: Apr. 12, 2022

(54) ANTI-COALESCING AGENT FOR THREE-DIMENSIONAL PRINTING

(71) Applicant: HEWLETT-PACKARD DEVELOPMENT COMPANY, L.P., Spring, TX (US)

(72) Inventors: Carolin Fleischmann, San Diego, CA (US); Shannon Reuben Woodruff, San Diego, CA (US); Jacob Tyler Wright, San Diego, CA (US); Geoffrey Schmid, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 11 days.

(21) Appl. No.: 16/488,646

(22) PCT Filed: Nov. 30, 2017

(86) PCT No.: PCT/US2017/063935
§ 371 (c)(1),
(2) Date: Aug. 26, 2019

(87) PCT Pub. No.: WO2019/108200
PCT Pub. Date: Jun. 6, 2019

(65) Prior Publication Data
US 2021/0291440 A1 Sep. 23, 2021

(51) Int. Cl.
*C09D 11/38* (2014.01)
*B33Y 10/00* (2015.01)
(Continued)

(52) U.S. Cl.
CPC ............ *C09D 11/38* (2013.01); *B29C 64/165* (2017.08); *B29C 64/194* (2017.08);
(Continued)

(58) Field of Classification Search
CPC ... B29C 64/165; B29C 64/194; B29C 64/264; C08G 65/007; C08F 14/26; B33Y 80/00; B33Y 10/00; B33Y 70/00
See application file for complete search history.

(56) References Cited

U.S. PATENT DOCUMENTS 5,674,314 A 10/1997 Auslander et al.
5,843,328 A 12/1998 Pacifici
(Continued)

FOREIGN PATENT DOCUMENTS

CN 1358807 A 7/2002
CN 102099416 A 6/2011
(Continued)

OTHER PUBLICATIONS

Junkab, Ita et al. 'The role of crystallinity on polymer interaction with oxygen plasma.' Plasma Processes and Polymers, 2009, vol. 6, pp. 667-675 See abstract: pp. 668-673: and table 1.
(Continued)

*Primary Examiner* — Nahida Sultana
(74) *Attorney, Agent, or Firm* — Dierker & Kavanaugh PC

(57) ABSTRACT

An example of an anti-coalescing agent for a three-dimensional (3D) printing process includes a vehicle and an anti-coalescing polymer dispersed in the vehicle. The vehicle includes a co-solvent, a surfactant, a humectant, and water. The anti-coalescing polymer has a mean particle size ranging from about 50 nm to about 195 nm, and the anti-coalescing polymer is to coat polymeric build material particles to prevent the polymeric build material particles from coalescing during electromagnetic radiation exposure of the 3D printing process.

15 Claims, 6 Drawing Sheets

(51) Int. Cl.

| | |
|---|---|
| ***B33Y 70/00*** | (2020.01) |
| ***B29C 64/165*** | (2017.01) |
| ***C08G 77/46*** | (2006.01) |
| ***C08L 27/18*** | (2006.01) |
| ***C08L 77/00*** | (2006.01) |
| ***C09D 11/102*** | (2014.01) |
| ***C09D 11/106*** | (2014.01) |
| ***B29C 64/264*** | (2017.01) |
| ***B29C 64/194*** | (2017.01) |
| ***B33Y 40/10*** | (2020.01) |
| ***C09D 11/037*** | (2014.01) |
| ***C09D 11/101*** | (2014.01) |
| ***C09D 11/322*** | (2014.01) |
| ***C08F 14/26*** | (2006.01) |
| ***C08G 65/00*** | (2006.01) |
| ***B29K 75/00*** | (2006.01) |
| ***B33Y 80/00*** | (2015.01) |

(52) U.S. Cl.

CPC ............ *B29C 64/264* (2017.08); *B33Y 10/00* (2014.12); *B33Y 40/10* (2020.01); *B33Y 70/00* (2014.12); *C08F 14/26* (2013.01); *C08G 65/007* (2013.01); *C08G 77/46* (2013.01); *C08L 27/18* (2013.01); *C08L 77/00* (2013.01); *C09D 11/037* (2013.01); *C09D 11/101* (2013.01); *C09D 11/102* (2013.01); *C09D 11/106* (2013.01); *C09D 11/322* (2013.01); *B29K 2075/00* (2013.01); *B29K 2995/004* (2013.01); *B29K 2995/0021* (2013.01); *B33Y 80/00* (2014.12); *C08L 2205/06* (2013.01)

(56) References Cited

U.S. PATENT DOCUMENTS

| | | | | |
|---|---|---|---|---|
| 5,958,547 | A | 9/1999 | Fukunishi | |
| 6,057,414 | A | 5/2000 | Razavi | |
| 8,258,203 | B2 | 9/2012 | Held et al. | |
| 9,327,452 | B2 | 5/2016 | Mark et al. | |
| 2009/0258984 | A1* | 10/2009 | Sandford | C08K 3/30 524/403 |
| 2012/0116003 | A1* | 5/2012 | Brothers | C08F 14/26 524/394 |
| 2015/0232654 | A1* | 8/2015 | Sugihara | C08F 220/20 522/64 |
| 2016/0271874 | A1 | 9/2016 | Tsai | |
| 2016/0312037 | A1 | 10/2016 | Zhao et al. | |
| 2016/0332370 | A1 | 11/2016 | Arai | |
| 2017/0028632 | A1* | 2/2017 | Cox | B29C 64/153 |
| 2017/0190929 | A1 | 7/2017 | Li | |
| 2017/0197366 | A1 | 7/2017 | Abbott | |
| 2017/0225396 | A1* | 8/2017 | Tom | B33Y 70/00 |
| 2017/0253702 | A1 | 9/2017 | Ma et al. | |
| 2017/0274594 | A1 | 9/2017 | Ng et al. | |
| 2017/0304894 | A1 | 10/2017 | Buller | |
| 2017/0312983 | A1 | 11/2017 | Birecki | |
| 2020/0079966 | A1* | 3/2020 | Holt | B28B 1/001 |
| 2021/0095152 | A1* | 4/2021 | Emamjomeh | C08L 27/18 |
| 2021/0115224 | A1* | 4/2021 | Kato | C08K 5/098 |

FOREIGN PATENT DOCUMENTS

| | | | |
|---|---|---|---|
| CN | 103709917 | B | 5/2016 |
| CN | 106796392 | A | 5/2017 |
| DE | 60215355 | T2 | 8/2007 |
| DE | 102007026006 | A1 | 4/2008 |
| GB | 1426157 | A | 2/1976 |
| JP | 2011178044 | A | 9/2011 |
| WO | WO-2012058278 | A3 | 7/2012 |
| WO | WO-2015100243 | A1 | 7/2015 |
| WO | WO-2015167520 | A1 | 11/2015 |
| WO | WO-2016053305 | | 4/2016 |
| WO | WO-2016053312 | A1 | 4/2016 |
| WO | WO-2016072966 | A1 | 5/2016 |
| WO | WO-2016099445 | A1 | 6/2016 |
| WO | 2016/171724 | A1 | 10/2016 |
| WO | 2016/175748 | A1 | 11/2016 |
| WO | 2017/018984 | A1 | 2/2017 |
| WO | WO-2017018985 | A1 | 2/2017 |
| WO | WO-2017069752 | A1 | 4/2017 |
| WO | WO-2017074397 | A1 | 5/2017 |
| WO | WO-2017127561 | A1 | 7/2017 |
| WO | WO-2017131757 | A1 | 8/2017 |
| WO | WO-2017196328 | A1 | 11/2017 |
| WO | WO-2018022034 | A1 | 2/2018 |

OTHER PUBLICATIONS

Wang, Mian et al., Cold atmospheric plasma (CAP) surface . . . , Sep. 22, 2016, Acta Biomaterialia.

* cited by examiner

RADIATION

ANTI-COALESCING AGENT FOR THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
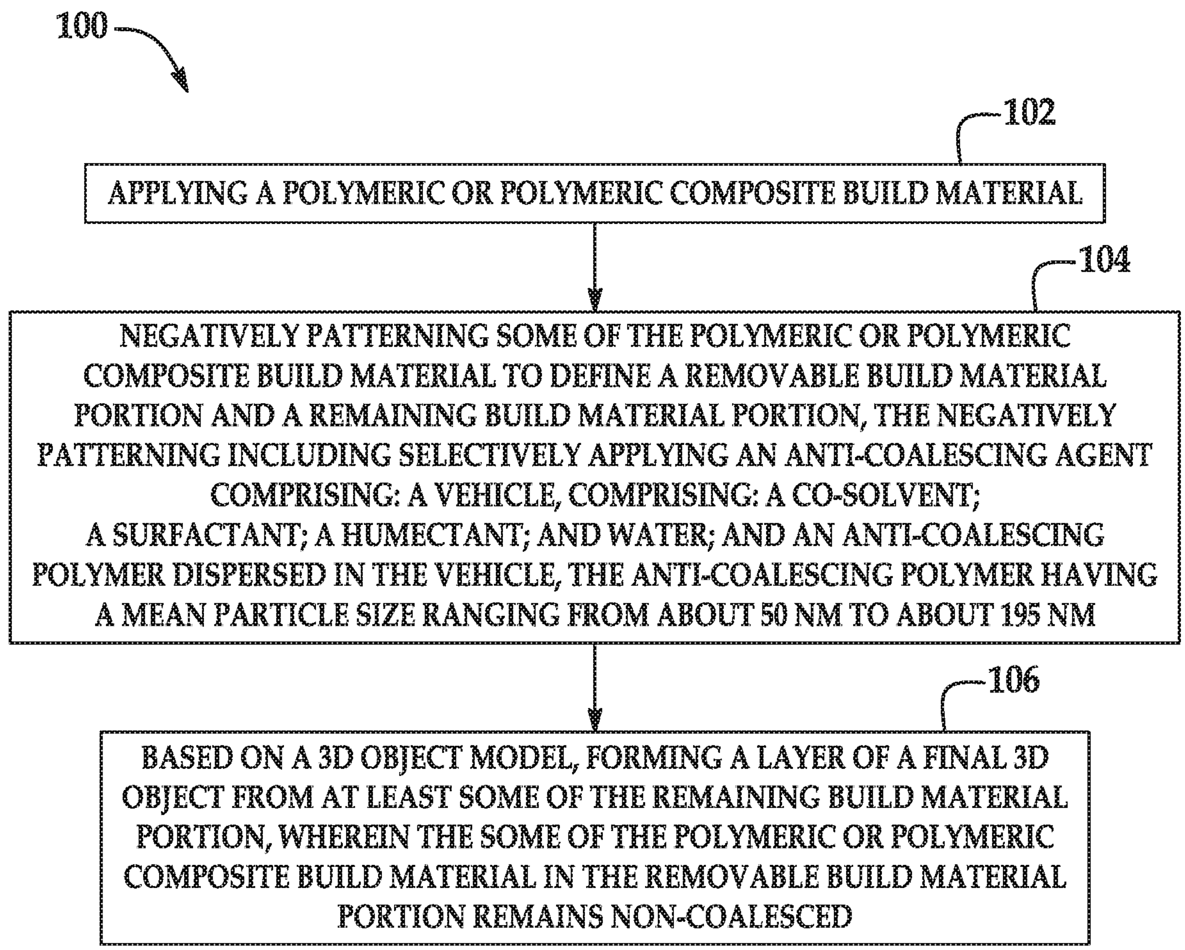
FIG. 1 is a flow diagram illustrating an example of a method for 3D printing disclosed herein.

Some examples of three-dimensional (3D) printing may utilize a fusing agent to pattern polymeric build material or polymeric composite build material. In these examples, an entire layer of the polymeric or polymeric composite build material is exposed to radiation, but the patterned region (which, in some instances, is less than the entire layer) of the polymeric or polymeric composite build material is fused and hardened to become a layer of a 3D object. In the patterned region, the fusing agent is capable of at least partially penetrating into voids between the polymeric or polymeric composite build material particles, and is also capable of spreading onto the exterior surface of the polymeric or polymeric composite build material particles. This fusing agent is capable of absorbing radiation and converting the absorbed radiation to thermal energy, which in turn fuses the polymeric or polymeric composite build material that is in contact with the fusing agent.

Other examples of 3D printing may utilize selective laser sintering (SLS) or selective laser melting (SLM). During selective laser sintering or melting, a laser beam is aimed at a selected region (generally less than the entire layer) of a layer of the polymeric or polymeric composite build material. Heat from the laser beam causes the polymeric or polymeric composite build material under the laser beam to fuse.

Fusing (through the use of the fusing agent or the laser beam) causes the polymeric or polymeric composite build material to join or blend to form a single entity (i.e., the layer of the 3D object). Fusing may involve at least partial thermal merging, melting, binding, and/or some other mechanism that coalesces the polymeric or polymeric composite build material to form the layer of the 3D object.

In some instances, the thermal energy converted from the absorbed radiation or applied by the laser beam may bleed or transfer into polymeric or polymeric composite build material particles that are not in contact with the fusing agent or the laser beam. This bleed or transfer of thermal energy may result in the polymeric or polymeric composite build material particles that were not intended to fuse (i.e., that were not patterned with the fusing agent or did not have the laser beam applied thereto) fusing or semi-fusing to the 3D object's surface. These fused or semi-fused particles attached to the 3D object's surface may reduce the surface finish quality and accuracy of the 3D object. For example, the surface may be undesirably rough and/or may have an undesirable appearance. As another example, the 3D object may be larger than intended.

Disclosed herein is an anti-coalescing agent including a vehicle and an anti-coalescing polymer dispersed in the vehicle. The anti-coalescing agent may be used to negatively pattern portions of the polymeric or polymeric composite build material (referred to herein as build material) that are not to become part of the final 3D object but that may be exposed to thermal energy bled or transferred from portions of the build material that are to become part of the final 3D object.

As used herein, the terms "negatively pattern," "negatively patterning," "negatively patterned," etc. refer to the application of liquid(s) (e.g., the anti-coalescing agent) to portion(s) of the build material that are not to become part of the final 3D object. It is to be understood that "negatively patterning" may include applying the liquid on all or less than all of the build material that is not to become part of the final 3D object. As such, in some examples disclosed herein, the anti-coalescing agent may be used to negatively pattern i) portions that surround the build material that is to become part of the final 3D object, ii) features, such as apertures, notches, cut-outs, or other areas where the build material is not supposed to fuse, or iii) a combination thereof. When the anti-coalescing agent is used, it is to be understood there may be some build material that is patterned with a detailing agent alone or that is non-patterned (i.e., neither the anti-coalescing agent, nor the fusing agent, nor the laser beam, nor the detailing agent is applied thereon). In other examples disclosed herein, the anti-coalescing agent may be used to negatively pattern all of the build material that is not to become part of the final 3D object. In these examples, there is no build material that is non-patterned.

When the anti-coalescing agent is applied, the anti-coalescing polymer forms a polymeric coating on the surfaces of the build material particles and in the voids between the build material particles. As such, the negatively patterning of the build material with the anti-coalescing agent defines a removable build material portion that contains build material with altered surface properties which prevent the build material from coalescing with other build material during 3D printing. As used herein, the term "removable build material portion" refers to the polymeric coating and the polymeric or polymeric composite build material upon/among which the polymeric coating is formed, which is removable from the final 3D object. As used herein, "upon" refers to the polymeric coating formed on surfaces of the build material particles, and "among" refers to the polymeric coating present in voids between the build material particles.

The polymeric coating prevents the build material, upon/among which the polymeric coating is formed, from fusing or semi-fusing. Thus, the polymeric coating may prevent the portions of the build material that are not to become part of the final 3D object, but that are exposed to bled or transferred thermal energy, from fusing to the final 3D object. As such, the printing process produces i) the final 3D object with improved surface finish quality and/or accuracy (as compared to a 3D object printed according to a comparable method for 3D printing but without using the anti-coalescing agent) and ii) a removable object in contact with at least a portion of the final 3D object.

As used herein, the term "removable object" refers to the sum of the removable build material portions that are formed throughout the printing process. As such, the removable object includes the polymeric coating and the polymeric or polymeric composite build material particles upon/among which the polymeric coating is formed. It is to be understood that the removable build material portions that make up the removable object may be contiguous or may be separated from each other (e.g., by the final 3D object). After printing, the removable object may be removed from the final 3D object.

In the examples disclosed herein, the anti-coalescing agent includes the vehicle and the anti-coalescing polymer dispersed in the vehicle. In some examples, the anti-coalescing agent for the three-dimensional (3D) printing process, comprises: a vehicle, comprising: a co-solvent; a surfactant; a humectant; and water; and an anti-coalescing polymer dispersed in the vehicle, the anti-coalescing polymer having a mean particle size ranging from about 50 nm to about 195 nm, and the anti-coalescing polymer to coat polymeric build material particles to prevent the polymeric build material particles from fusing during electromagnetic radiation exposure of the 3D printing process. In these examples, the anti-coalescing agent may include additional components.

In another example, the anti-coalescing agent consists of: the vehicle, comprising: a co-solvent; a surfactant; a humectant; and water; and an anti-coalescing polymer dispersed in the vehicle, the anti-coalescing polymer having a mean particle size ranging from about 50 nm to about 195 nm, and the anti-coalescing polymer to coat polymeric build material particles to prevent the polymeric build material particles from fusing during electromagnetic radiation exposure of the 3D printing process. In these examples, the anti-coalescing agent does not include any additional components.

The anti-coalescing polymer may be any polymer capable of coating polymeric build material particles and capable of preventing the polymeric build material particles, fibers, etc. from coalescing (e.g., fusing, thermally merging, etc.) during electromagnetic radiation exposure of a 3D printing process. In an example, the anti-coalescing polymer has a mean particle size ranging from about 50 nm to about 195 nm. The term "particle size", as used herein, refers to the diameter of a spherical particle, or the average diameter of a non-spherical particle (i.e., the average of multiple diameters across the particle), or the volume-weighted mean diameter of a particle distribution.

In some examples, the anti-coalescing polymer is a perfluorinated polymer. It has been found that perfluorinated polymers are capable of both forming a coating on the build material and of keeping the build material from coalescing when heated to a temperature that would otherwise cause the material to coalesce. In one of these examples, the perfluorinated polymer is selected from the group consisting of a perfluoroalkoxy alkane, poly(tetrafluoroethylene), a perfluorinated polyether, fluorinated ethylene propylene, and combinations thereof. Examples of a perfluoroalkoxy alkane have a chemical structure of:

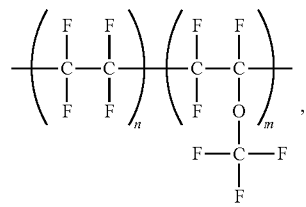

where n is greater than 5 and less than 100,000 and m is greater than 5 and less than 100,000. Examples of a poly(tetrafluoroethylene) have a chemical structure of:

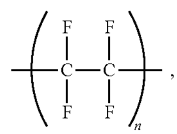

where n is greater than 5 and less than 100,000. An example of poly(tetrafluoroethylene) includes TEFLON® (available from E. I. du Pont de Nemours and Company). Examples of a perfluorinated polyether have a chemical structure of:

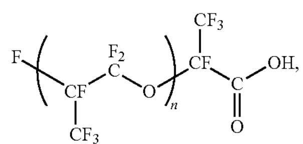

where n is greater than 5 and less than 100,000. In some examples of the perfluorinated polyether, n ranges from 10 to 60. Examples of a perfluorinated polyether include KRYTOX™ lubricants (available from The Chemours Company). Examples of fluorinated ethylene propylene have a chemical structure of:

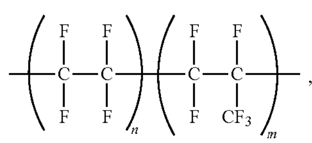

where n is greater than 5 and less than 100,000 and m is greater than 5 and less than 100,000.

In an example, the anti-coalescing polymer is included in the anti-coalescing agent in an amount ranging from about 2 wt % to about 30 wt %, based on the total weight of the anti-coalescing agent. In another example, the anti-coalescing polymer is included in the anti-coalescing agent in an amount ranging from about 3 wt % to about 10 wt %, based on the total weight of the anti-coalescing polymer agent.

The anti-coalescing polymer is selected so that it will form the polymeric coating. The polymeric coating may form before the vehicle evaporates (i.e., as the anti-coalescing agent penetrated into the build material), or as the vehicle evaporates, or after the vehicle evaporates, or combinations thereof. The polymeric coating enables the build material within the removable build material portion to remain non-fused, and thus separable from layers of the final 3D object. The polymeric coating changes the surface properties of the polymeric or polymeric composite build material in the removable build material portion such that the anti-coalescing polymer coated build material does not fuse or coalesce. More particularly, the build material coated with the polymeric coating (i.e., the build material particles in the removable build material portion) do not fuse or coalesce with build material that is not coated with the polymeric coating (e.g., the polymeric or polymeric composite build material in the portion that is to form part of the final 3D object) nor with other build material that is coated with the polymeric coating. In an example, the build material particles coated with the polymeric coating do not coalesce (e.g., by fusing, melting, thermally migrating, etc.) even when heated to a temperature at or above the melting temperature of the polymeric or polymeric composite build material.

As mentioned above, the anti-coalescing agent also includes the vehicle. As used herein, "vehicle" may refer to the liquid in which the anti-coalescing polymer is dispersed to form the anti-coalescing agent. In some examples, the vehicle includes a co-solvent, a surfactant, a humectant, and water. In these examples, the vehicle may include additional components, such as anti-kogation agent(s), antimicrobial agent(s), and/or chelating agent(s), each of which is described below in reference to the fusing agent. In other examples, the vehicle consists of a co-solvent, a surfactant, a humectant, and water without any other components.

Water may make up the balance of the anti-coalescing agent. As such, the amount of water may vary depending upon the amounts of the other components that are included. As an example, deionized water may be used.

The vehicle may also include co-solvent(s). In an example, the total amount of the co-solvent(s) present in the anti-coalescing agent ranges from about 10 wt % to about 20 wt %, based on the total weight of the anti-coalescing agent.

Classes of organic co-solvents that may be used in the vehicle include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) of the vehicle may depend, in part upon the jetting technology that is to be used to dispense the anti-coalescing agent. For example, if thermal inkjet printheads are to be used, water and/or ethanol and/or other longer chain alcohols (e.g., pentanol) may make up 35 wt % or more of the anti-coalescing agent. For another example, if piezoelectric inkjet printheads are to be used, water may make up from about 25 wt % to about 30 wt % of the anti-coalescing agent, and 35 wt % or more of the anti-coalescing agent may be ethanol, isopropanol, acetone, etc.

The vehicle may include surfactant(s) to improve the jettability of the anti-coalescing agent. In an example, the total amount of the surfactant(s) present in the anti-coalescing agent ranges from about 0.25 wt % to about 3 wt %, based on the total weight of the anti-coalescing agent.

In an example, the vehicle includes a blend of surfactants. The blend may include non-ionic surfactant(s) and anionic surfactant(s). As one example, the blend includes three different non-ionic surfactants and one anionic surfactant. For example, the surfactants include a first non-ionic surfactant having a first hydrophilic chain length; a second non-ionic surfactant having a second hydrophilic chain length that is different than the first hydrophilic chain length; a third non-ionic surfactant, wherein the third non-ionic surfactant is selected from the group consisting of a polyether siloxane and an alkoxylated alcohol; and an anionic surfactant. More specifically, the first non-ionic surfactant may be TERGITOL™ TMN-6 (available from The Dow Chemical Company), the second non-ionic surfactant may be TERGITOL™ 15-S-30 (which has a higher HLB number and a longer hydrophilic chain length than TERGITOL™ TMN-6), the third non-ionic surfactant is a polyether siloxane (e.g., TEGO® Wet 270 or TEGO® Wet 280, available from Evonik) or an alkoxylated alcohol (e.g., TEGO® Wet 510 available from Evonik), and anionic surfactant may be alkyldiphenyloxide disulfonate (e.g., the DOWFAX™ series, such a 2A1, 3B2, 8390, C6L, C10L, and 30599). The first non-ionic surfactant and the second non-ionic surfactant may also be selected from the IGEPAL® series (available from Rhodia), the PLURONIC® series (available from BASF Corp.), the TRITON™ series (available from The Dow Chemical Company), the ECOSURF™ EH series (available from The Dow Chemical Company), and the ECOSURF™ SA series (available from The Dow Chemical Company), as long as the two non-ionic surfactants have different hydrophilic chain lengths.

A balance of the non-ionic surfactants and the anionic surfactant allows for better stabilization of all of the components and balance of the total surface tension of the anti-coalescing agent. In some examples, the first non-ionic surfactant may be present in an amount ranging from about 0.1 wt % to about 1 wt %; the second non-ionic surfactant may be present in an amount ranging from about 0.1 wt % to about 1 wt %; the third non-ionic surfactant may be present in an amount ranging from about 0.1 wt % to about 1 wt %; and/or the anionic surfactant may be present in an amount ranging from about 0.1 wt % to about 1 wt % (based on the total weight of the anti-coalescing agent).

In other examples, the non-ionic surfactants of the surfactant blend may be replaced with other non-ionic surfactants, such as a self-emulsifiable, non-ionic wetting agent based on acetylenic diol chemistry (e.g., SURFYNOL® SEF from Air Products and Chemicals, Inc.), and/or an ethoxylated low-foam wetting agent (e.g., SURFYNOL® 465, SURFYNOL® 440 or SURFYNOL® CT-111 from Air Products and Chemical Inc.), and/or an ethoxylated wetting agent and molecular defoamer (e.g., SURFYNOL® 420 from Air Products and Chemical Inc.). Still other suitable non-ionic surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, TERGITOL™ 15-S-9, or TERGITOL™ 15-S-30 (a secondary alcohol ethoxylate) from The Dow Chemical Company). Another suitable non-ionic surfactant is an alkoxylated alcohol, such as TECO® Wet 510 available from Evonik.

In still other examples, the surfactant may be a fluorosurfactant. As an example, a non-ionic fluorosurfactant (e.g., CAPSTONE® fluorosurfactants, such as CAPSTONE® FS-35, from E. I. du Pont de Nemours and Company, previously known as ZONYL FSO) may be used.

The vehicle may also include humectant(s). In an example, the total amount of the humectant(s) present in the anti-coalescing agent ranges from about 3 wt % to about 10 wt %, based on the total weight of the anti-coalescing agent. An example of a suitable humectant is LIPONIC® EG-1 (i.e., LEG-1, glycereth-26, ethoxylated glycerol, available from Lipo Chemicals).

In an example, the anti-coalescing agent has a surface tension ranging from about 20 dynes/cm to about 28 dynes/cm. A surface tension within this range is desirable, as it may allow the anti-coalescing agent (and thus, the anti-coalescing polymer) to penetrate an entire layer of build material, which may allow the anti-coalescing polymer to form the polymeric coating on all or substantially all of the build material particles in the some of the build material that becomes the removable build material portion. While the selection of the anti-coalescing polymer provides the coated build material of the removable build material portion with the ability to remain intact (i.e., non-coalesced) upon heat/energy exposure, it is to be understood that the surface tension of the anti-coalescing agent within this range may assist in the placement of the anti-coalescing polymer in desirable locations within a layer of build material and upon the surfaces of the build material.

Referring now to FIG. 1 and FIGS. 2A through 2E, examples of a method 100, 200 for three-dimensional (3D) printing are depicted. Prior to execution of the method 100, 200 or as part of the method 100, 200 a controller 54 (see, e.g., FIG. 4) may access data stored in a data store 56 (see, e.g., FIG. 4) pertaining to a 3D object that is to be printed. The controller 54 may determine the number of layers of polymeric or polymeric composite build material 16 that are to be formed, and the locations at which the anti-coalescing agent 28 from the applicator 24B is to be deposited on each of the respective layers.

As shown in FIG. 1, an example of the three-dimensional (3D) printing method 100 comprises: applying a polymeric or polymeric composite build material 16 (reference numeral 102); negatively patterning some 34' of the polymeric or polymeric composite build material 16 to define a removable build material portion 34 and a remaining build material portion, the negatively patterning including: selectively applying an anti-coalescing agent 28 comprising: a vehicle, comprising: a co-solvent; a surfactant; a humectant; and water; and an anti-coalescing polymer dispersed in the vehicle, the anti-coalescing polymer having a mean particle size ranging from about 50 nm to about 195 nm (reference numeral 104); based on a 3D object model, forming a layer 42 of a final 3D object 44 from at least some 32 of the remaining build material portion, wherein the some 34' of the polymeric or polymeric composite build material 16 in the removable build material portion 34 remains non-coalesced (reference numeral 106).

Figure 2A:
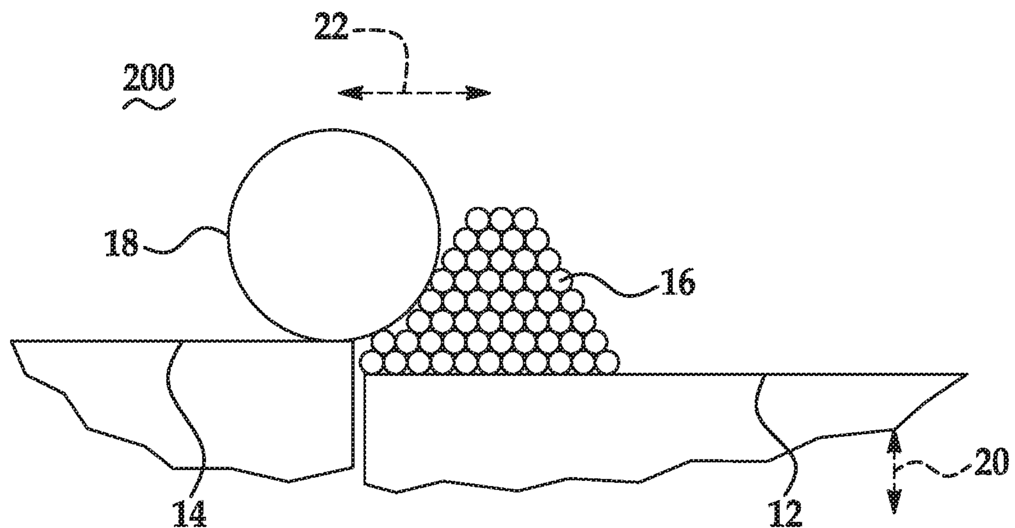
FIGS. 2A through 2E are schematic and partially cross-sectional cutaway views depicting the formation of a final 3D object using an example of a method for 3D printing disclosed herein.
Figure 2B:
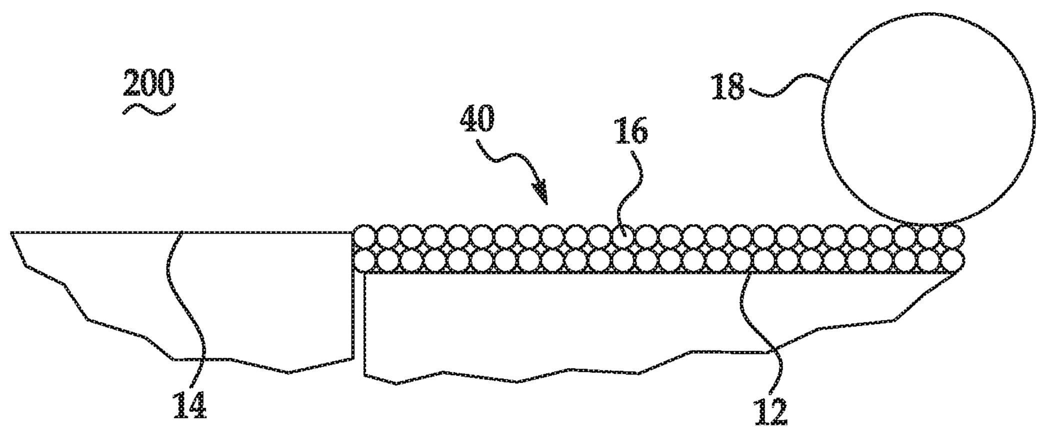

As shown at reference numeral 102 in FIG. 1 and in FIGS. 2A and 2B, the method 100, 200, includes applying the polymeric or polymeric composite build material 16. In the example shown in FIGS. 2A and 2B, a printing system (e.g., printing system 10 shown in FIG. 4) may be used to apply the build material 16. The printing system 10 may include a build area platform 12, a build material supply 14 containing build material particles 16, and a build material distributor 18.

The build area platform 12 receives the build material 16 from the build material supply 14. The build area platform 12 may be moved in the directions as denoted by the arrow 20, e.g., along the z-axis, so that the build material 16 may be delivered to the build area platform 12 or to a previously formed layer 42. In an example, when the build material particles 16 are to be delivered, the build area platform 12 may be programmed to advance (e.g., downward) enough so that the build material distributor 18 can push the build material particles 16 onto the build area platform 12 to form a substantially uniform layer 40 of build material 16 thereon. The build area platform 12 may also be returned to its original position, for example, when a new part is to be built.

The build material supply 14 may be a container, bed, or other surface that is to position the build material particles 16 between the build material distributor 18 and the build area platform 12.

The build material distributor 18 may be moved in the directions as denoted by the arrow 22, e.g., along the y-axis, over the build material supply 14 and across the build area platform 12 to spread the layer 40 of the build material 16 over the build area platform 12. The build material distributor 18 may also be returned to a position adjacent to the build material supply 14 following the spreading of the build material particles 16. The build material distributor 18 may be a blade (e.g., a doctor blade), a roller, a combination of a roller and a blade, and/or any other device capable of spreading the build material 16 over the build area platform 12. For instance, the build material distributor 18 may be a counter-rotating roller. In some examples, the build material supply 14 or a portion of the build material supply 14 may translate along with the build material distributor 18 such that build material 16 is delivered continuously to the material distributor 18 rather than being supplied from a single location at the side of the printing system 10 as depicted in FIG. 2A.

As shown in FIG. 2A, the build material supply 14 may supply the build material particles 16 into a position so that they are ready to be spread onto the build area platform 12. The build material distributor 18 may spread the supplied build material particles 16 onto the build area platform 12. The controller 54 may process control build material supply data, and in response control the build material supply 14 to appropriately position the build material particles 16, and may process control spreader data, and in response, control the build material distributor 18 to spread the supplied build material particles 16 over the build area platform 12 to form the layer 40 of build material 16 thereon. As shown in FIG. 2B, one build material layer 40 has been formed.

The layer 40 of polymeric or polymeric composite build material 16 has a substantially uniform thickness across the build area platform 12. In an example, the thickness of the build material layer 40 is about 100 μm. In another example, the thickness of the build material layer 40 ranges from about 30 μm to about 300 μm, although thinner or thicker layers may also be used. For example, the thickness of the build material layer 40 may range from about 20 μm to about 500 μm, or from about 50 μm to about 80 μm. The layer thickness may be about 2× (i.e., 2 times) the particle diameter (as shown in FIG. 2B) at a minimum for finer part definition. In some examples, the layer thickness may be about 1.5× the particle diameter.

After the build material 16 has been applied, and prior to further processing, the build material layer 40 may be exposed to heating. Heating may be performed to pre-heat the build material particles 16, and thus the heating temperature may be below the melting point or softening point of the polymeric or polymeric composite build material particles 16. As such, the temperature selected will depend upon the polymeric or polymeric composite build material particles 16 that are used. As examples, the pre-heating temperature may be from about 5° C. to about 50° C. below the melting point or softening point of the polymeric or polymeric composite build material particles 16. In an example, the pre-heating temperature ranges from about 50° C. to about 250° C. In another example, the pre-heating temperature ranges from about 150° C. to about 170° C.

Pre-heating the layer 40 of the build material particles 16 may be accomplished using any suitable heat source that exposes all of the polymeric or polymeric composite build material particles 16 on the build area platform 12 to the heat. Examples of the heat source include a thermal heat source (e.g., a heater (not shown) integrated into the build area platform 12 (which may include sidewalls)) or the radiation source 50, 50' (see, e.g., FIG. 4).

Figure 2C:
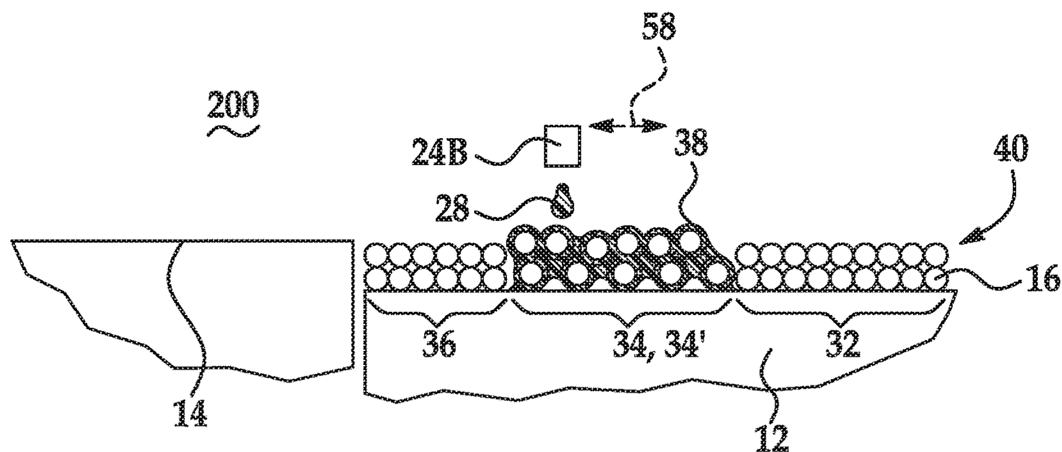

As shown at reference numeral 104 in FIG. 1 and FIG. 2C, the method 100, 200 continues by negatively patterning some 34' of the polymeric or polymeric composite build material 16 to define the removable build material portion 34 and the remaining build material portion. Once the anti-coalescing agent 28 is applied to some 34' of the build material 16, the polymeric coating 38 is formed on the surfaces of the some 34' of the build material particles 16 and is present in at least some of the voids between the some 34' of the build material particles 16, and this forms the removable build material portion 34. As such, the removable build material portion 34 includes the polymeric coating 38 and any build material particles 16 upon/among which the polymeric coating is formed.

The remaining build material portion includes any build material 16 that is not negatively patterned with the anti-coalescing agent 28. At least some 32 of the remaining build material portion is to form the layer 42 of the final 3D object 44 (shown in FIG. 4). In some examples, all of the remaining build material portion will form the layer 42. In other examples, the remaining build material portion may also include another portion 36 (also referred to herein as the third portion), which is not to form the layer 42 of the final 3D object 44. In some examples, the third portion 36 may be non-patterned (i.e., may have no liquid applied thereto).

In an example, the removable build material portion 34 is at least partially adjacent to the at least some 32 of the remaining build material portion. In another example, the removable build material portion 34 includes i) portions of the build material 16 that surround the at least some 32 of the remaining build material portion, ii) features, such as apertures, notches, cut-outs, or other areas where the build material 16 is not supposed to fuse, or iii) a combination thereof.

Figure 3:
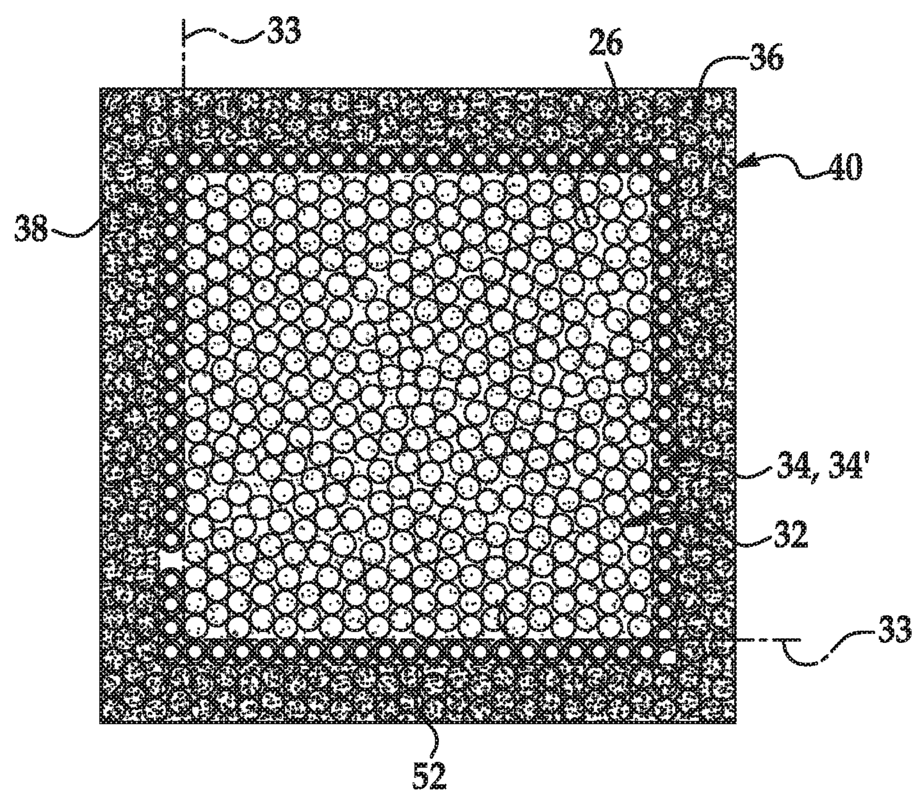
FIG. 3 is a top, schematic view of the build material, with some of the build material negatively patterned, some other of the build material patterned with a fusing agent, and still some other of the build material having a detailing agent applied thereon.

An example of this is shown in FIG. 3 (top view of the build material 16 on the build area platform 12). In the example shown in this figure, the shape of the final 3D object layer to be formed is a cube or a rectangular prism, and the pattern of the cross-section that is parallel to the surface of the build area platform 12 is a square or rectangle having an edge boundary 33. The build material 16 within the edge boundary 33 is the at least some 32 of the remaining build material portion which forms the layer 42 of the final 3D object 44. In the example shown in FIG. 3, the at least some 32 of the remaining build material portion has the fusing agent 26 applied thereon. The build material 16 positioned along the outside of the edge boundary 33 is the build material 16 within the removable build material portion 34, and thus, is coated with the polymeric coating 38. The build material 16 positioned outside of the removable build material portion 34 is the build material 16 within the third portion 36, and thus, may be non-patterned or may have a detailing agent 52 (see, e.g., FIG. 4) applied thereon. In the example shown in FIG. 3, the third portion 36 has the detailing agent 52 applied thereon.

As shown in FIG. 2C, the negatively patterning includes selectively applying the anti-coalescing agent 28. As mentioned above, the anti-coalescing agent 28 includes the vehicle and the anti-coalescing polymer dispersed in the vehicle. In an example of the method 100, 200 the anti-coalescing polymer is a perfluorinated polymer selected from the group consisting of a perfluoroalkoxy alkane, poly(tetrafluoroethylene), a perfluorinated polyether, fluorinated ethylene propylene, and combinations thereof.

As illustrated in FIG. 2C, the anti-coalescing agent 28 may be dispensed from the second applicator 24B. The applicator 24B may be a thermal inkjet printhead, a piezoelectric printhead, a continuous inkjet printhead, etc., and the selectively applying of the anti-coalescing agent 28 may be accomplished by thermal inkjet printing, piezo electric inkjet printing, continuous inkjet printing, etc.

The controller 54 may process data, and in response, control the second applicator 24B (e.g., in the directions indicated by the arrow 38) to deposit the anti-coalescing agent 28 to define the removable build material portion 34 and the remaining build material portion. The second applicator 24B may be programmed to receive commands from the controller 54 and to deposit the anti-coalescing agent 28 according to a pattern of a cross-section for the removable build material portion 34. In the example shown in FIG. 2C, the second applicator 24B selectively applies the anti-coalescing agent 28 to the build material 16 that is to be part of the removable build material portion 34. In the example shown in FIG. 2C, the anti-coalescing agent 28 is deposited on the some 34' of the build material 16 and not on the at least some 32 of the remaining build material portion or the third portion 36.

When the anti-coalescing agent 28 is selectively applied, the anti-coalescing polymer (present in the anti-coalescing agent 28) forms the polymeric coating 38, on the surfaces of the build material particles 16 and in the voids between the build material particles 16, in the removable build material portion 34. The volume of the anti-coalescing agent 28 that is applied per unit of the build material 16 may be sufficient to achieve the polymeric coating 38 that enables the build material 16 in the removable build material portion 34 to remain non-coalesced even after exposure to heating during the 3D printing process. In an example, the volume of the anti-coalescing agent 28 that is applied may establish a desired coating density and/or thickness of the polymeric coating 38. As such, the polymeric coating 38 may prevent the build material particles 16 upon/among which it is formed from fusing or semi-fusing.

As shown at reference numeral 106, the method 100, 200 continues by forming the layer 42 of the final 3D object 44 from the at least some 32 of the remaining build material portion. The formation of the layer 42 may be based on a 3D object model of the final 3D object 44.

In one example of the method 100, the forming of the layer 42 involves selectively laser sintering, based on the 3D object model, the at least some 32 of the remaining build material portion. In these examples, a laser beam is used to selectively apply radiation to the at least some 32 of the remaining build material portion. The laser beam may be applied with the source 50 of radiation.

When the forming of the layer 42 involves selectively laser sintering (SLS), the removable build material portion 34 is negatively patterned first, and then the energy beam is selectively applied to the at least some 32 of the remaining build material portion.

In SLS, the energy beam may be supplied from the source 50, which may be a tightly focused energy source, such as a laser, electron beam or microwave tip emitter.

The controller 54 may process data, and in response, control the source 50 of radiation (e.g., in the directions indicated by the arrow 58 and/or in directions along the X-axis) to apply radiation to the at least some 32 of the remaining build material portion that is to become part of the final 3D object 44. The source 50 may be attached to a scanning system that allows the source 50 to be moved into a desirable position so that the energy beam is selectively applied to the at least some 32 of the remaining build material portion where it is desirable to form the layer 42. In an example, the tightly focused energy source 50 and the scanning system may be attached to a moving XY stage or a translational carriage 60 (see, e.g., FIG. 4) that moves them adjacent to the layer 40 in order to direct the energy beam in desirable area(s). Depending, in part, on the dimensions of the energy source 50 and the area of the build material 16 to be fused (i.e., some 32), the tightly focused energy source 50 may have to be moved in order to create the layer 42. For example, the source 50 may be programmed to receive commands from the controller 54 and to apply the radiation according to a pattern of a cross-section for the layer 42 of the final 3D object 44 that is to be formed. The scanning system may move the source 50 into a suitable position with respect to the some 32 of the remaining build material portion in order to create the layer 42. In other examples, the tightly focused energy source 50 and the scanning system may be fixed while a support member (similar to the build area platform 12) is configured to move relative thereto.

The amount of energy that is applied per unit of the build material 16 in the at least some 32 of the remaining build material portion and/or the time of exposure may be sufficient to cause the build material 16 in the portion 32 to fuse. The amount of energy that is applied per unit of the build material 16 and/or the exposure time may depend, at least in part, on the source 50 of radiation used, the energy of the radiation applied, the wavelength of the radiation applied, and the build material 16 used.

The build material 16 that is exposed to energy from the tightly focused energy source 50 fuses. The selective application of the energy heats the polymeric or polymeric composite build material particles 16. In an example, the selective application of the radiation sufficiently elevates the temperature of the polymeric or polymeric composite build material particles 16 in the layer 40 above the melting or softening point of the particles 16, allowing fusing (e.g., melting, binding, etc.) of the polymeric or polymeric composite build material particles 16 to take place. The selective application of the radiation forms the fused layer 42.

In another example of the method 100, 200, the forming of the layer 42 involves: based on the 3D object model, selectively applying a fusing agent 26 on the at least some 32 of the remaining build material portion; and exposing the polymeric or polymeric composite build material 16 to radiation to fuse the at least some 32 of the remaining build material portion. The fusing agent 26 includes a radiation absorber. The composition of the fusing agent 26 will be described in more detail below.

Figure 2D:
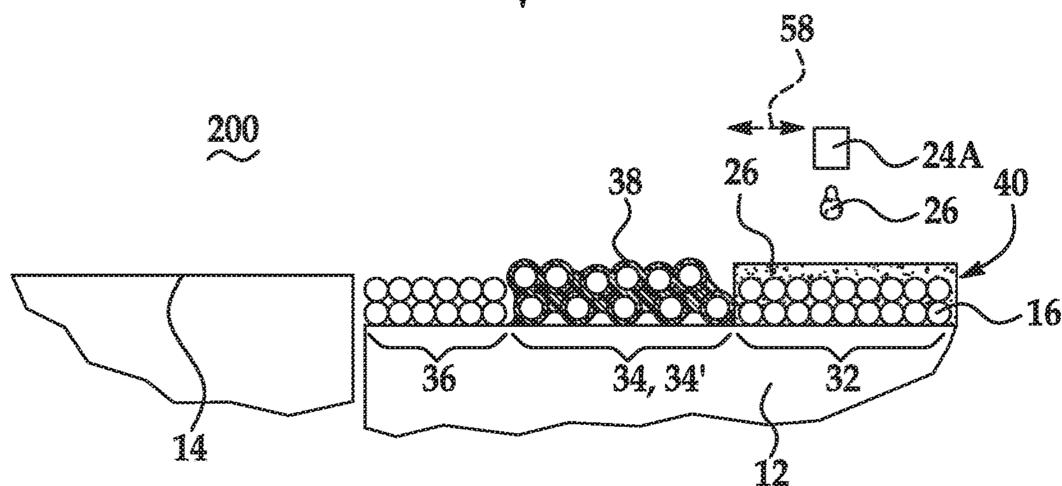

As illustrated in FIG. 2D, the fusing agent 26 may be dispensed from the first applicator 24A (which may be similar to applicator 24B) to pattern the at least some 32 of the remaining build material portion. In an example, the removable build material portion 34 may be negatively patterned first, and then the at least some 32 of the remaining build material portion may be patterned. In another example, the at least some 32 of the remaining build material portion may be patterned first, and then the removable build material portion 34 may be negatively patterned. In still another example, the at least some 32 of the remaining build material portion may be patterned and the removable build material portion 34 may be negatively patterned at least substantially simultaneously (e.g., at the same time). In all of these examples, the removable build material portion 34 is negatively patterned before the build material 16 is exposed to radiation.

The controller 54 may process data, and in response, control the first applicator 24A (e.g., in the directions indicated by the arrow 58) to deposit the fusing agent 26 onto the at least some 32 of the remaining build material portion that is to become part of the final 3D object 44. The first applicator 24A may be programmed to receive commands from the controller 54 and to deposit the fusing agent 26 according to a pattern of a cross-section for the layer 42 of the final 3D object 44 that is to be formed. In the example shown in FIG. 2D, the first applicator 24A selectively applies the fusing agent 26 on the at least some 32 of the remaining build material portion of the layer 40 that is to become the first layer 42 of the final 3D object 44. In the example shown in FIG. 2D, the fusing agent 26 is deposited on the at least some 32 of the remaining build material portion of the layer 40 and not on the removable build material portion 34 or the third portion 36.

As mentioned above, the fusing agent 26 includes the radiation absorber. The volume of the fusing agent 26 that is applied per unit of the build material 16 in the at least some 32 of the remaining build material portion may be sufficient to absorb and convert enough radiation so that the build material 16 in the patterned portion 32 will fuse. The volume of the fusing agent 26 that is applied per unit of the build material 16 may depend, at least in part, on the radiation absorber used, the radiation absorber loading in the fusing agent 26, and the build material 16 used.

After the fusing agent 26 is selectively applied, the build material 16 is exposed to radiation to fuse the at least some 32 of the remaining build material portion. The radiation may be applied with the source 50, 50' of radiation.

The fusing agent 26 enhances the absorption of the radiation, converts the absorbed radiation to thermal energy, and promotes the transfer of the thermal heat to the polymeric or polymeric composite build material particles 16 in contact therewith. In an example, the fusing agent 26 sufficiently elevates the temperature of the build material particles 16 in the layer 40 above the melting or softening point of the particles 16, allowing coalescing (e.g., fusing, thermal merging, melting, binding, etc.) of the polymeric or polymeric composite build material particles 16 to take place. The application of the radiation forms the fused layer 42, shown in FIG. 2E.

Figure 2E:
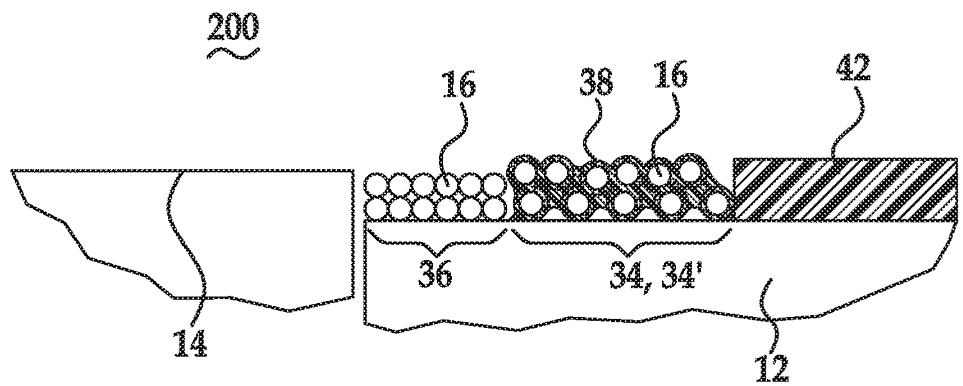

Whether the energy beam (e.g., SLS) or the combination of the fusing agent 26 and applied radiation is used, it is to be understood that the build material 16 in the removable build material portion 34 does not fuse or semi-fuse to the layer 42. As shown in FIG. 2E, the removable build material portion 34 remains physically separable from the layer 42. The polymeric coating 38 maintains the separation between the build material 16 in the removable build material portion 34 and the fused layer 42. As such, the polymeric coating 38 prevents the fusing or semi-fusing of the build material 16 in the removable build material portion 34 to the surface of the final 3D object 44. Thus, the final 3D object 44 may have improved surface finish quality and/or accuracy (as compared to a 3D object printed according to a comparable method for 3D printing but without using the anti-coalescing agent 28).

In some examples, the build material 16 in the removable build material portion 34 reaches a temperature at or above the melting temperature of the polymeric or polymeric composite build material 16. In these examples, the polymeric coating 38 still maintains the separation between the build material 16 in the removable build material portion 34 and the fused layer 42. As such, the polymeric coating 38 changes the surface properties of the build material particles 16 in the removable build material portion 34 such that the particles 16 do not coalesce, i.e., fuse, melt, thermally merge, etc. together, during heating.

In some examples, the method 100, 200 further comprises repeating the applying of the polymeric or polymeric composite build material 16, the negatively patterning, and the forming, wherein the repeating forms i) the final 3D object 44 including the layer 42 and ii) a removable object 46 (see, e.g., FIG. 4) in contact with at least a portion of the final 3D object 44, the removable object 46 including the removable build material portion 34.

In these examples, a three-dimensional (3D) printed article 48 (see, e.g., FIG. 4) may be formed. In an example, the three-dimensional (3D) printed article 48 comprises: a fused polymer or polymer composite object 44; and a removable object 46 in contact with at least a portion of the fused polymer or polymer composite object 44, the removable object 46 comprising: polymeric or polymeric composite build material particles 16; and a polymeric coating 38 formed on surfaces of the polymeric or polymeric composite build material particles 16 and present in voids between the polymeric or polymeric composite build material particles 16, wherein the polymeric coating 38 is a perfluorinated polymer. In this example, the perfluorinated polymer may be selected from the group consisting of a perfluoroalkoxy alkane, poly(tetrafluoroethylene), a perfluorinated polyether, fluorinated ethylene propylene, and combinations thereof.

In an example, the removable object 46 at least partially surrounds the final 3D object 44. In another example, the final 3D object 44 at least partially surrounds the removable object 46 (e.g., once removed, the removable object 46 will form a notch, aperture, etc. in the final 3D object 44). In still another example, the removable build material portion 34 is located outside of an edge of the remaining build material portion or is at least partially surrounded by the remaining build material portion.

The removable object 46 may be removed from the final 3D object 44 by any suitable means. In an example, the removable object 46 may be removed from the final 3D object 44 by lifting the final 3D object 44 from the removable object 46. In some examples, the removable object 46 may be broken into pieces and removed piecewise from the final 3D objet 44. In some other examples, a removal tool may be used. In still other examples, the removable object 46 may be removed from the final 3D object 44 using a wet or a dry removal process. In an example, the wet removal process may include spraying the removable object 46 with water or another liquid using wet removal tool(s), such as a hose and a sprayer, a spray gun, etc. In other examples, the wet removal process may include sonicating the removable object 46 in a water bath or soaking the removable object 46 in water or another liquid. In some examples, dry removal of the removable object 46 from the final 3D object 44 may be used. As an example, the removable object 46 may be removed from the final 3D object 44 by suction from a vacuum hose. Pieces of the removable object 46 that remain in contact with the final 3D object 44 may be removed by light bead blasting or cleaning with a brush and/or an air jet.

Several variations of the previously described method 100, 200 will now be described.

In some examples, it may be desirable to apply the laser beam to the removable build material portion 34 or to apply the fusing agent 26 on the removable build material portion 34, so that during the exposing of the build material 16 to energy/radiation, the removable build material portion 34 is heated to a temperature at or above the melting temperature of the polymeric or polymeric composite build material 16. Heating the removable build material portion 34 to such a temperature may prevent or reduce the formation of thermal gradients during the fusing of the layer 42. The formation of thermal gradients may be undesirable because they may cause surface defects and/or shrinkage effects in the final 3D object 44.

As such, in some examples, the method 100, 200 further comprises selectively applying the fusing agent 26 on the removable build material portion 34. In these examples, the anti-coalescing agent 28 is applied on the some 34' of the build material first, and then the fusing agent 26 is applied on the same some 34' of the build material 16 in the removable build material portion 34. If the fusing agent 26 is applied on the some 34' of the build material 16 before the anti-coalescing agent 28 is applied, then energy (from pre-heating, from a previous layer, etc.) may cause the some 34' of the build material to coalesce (e.g., fuse or semi-fuse) after the fusing agent 26 is applied and before the anti-coalescing agent 28 is applied.

In other examples, the method 100, 200 further comprises selectively applying the energy beam on the removable build material portion 34. When the fusing agent 26 or the energy beam is applied on the removable build material portion 34, an amount of the fusing agent 26 applied or the amount of the energy applied (from the laser beam) may be less than the amount applied on the at least some 32 of the remaining build material portion. Alternatively, a greater amount (e.g., 40 g/$m^2$) of the anti-coalescing agent 28 may be applied then would be applied if the fusing agent 26 or the energy beam were not to be applied on the removable build material portion 34.

In other examples of the method 100, 200, a detailing agent 52 may be used. In some examples, the detailing agent 52 may include a surfactant, a co-solvent, and water. The composition of the detailing agent 52 will be described in more detail below. The detailing agent 52 may be dispensed from another (e.g., a third) applicator 24C (which may be similar to applicators 24A, 24B) and applied to portion(s) of the build material 16.

The detailing agent 52 may provide an evaporative cooling effect to the build material 16 to which it is applied. The cooling effect of the detailing agent 52 reduces the temperature of the polymeric or polymeric composite build material 16 containing the detailing agent 52 during energy/radiation exposure. The detailing agent 52, and its rapid cooling effect, may be used to obtain different levels of melting/fusing/binding within the layer 42 of the 3D object 44 that is being formed. Different levels of melting/fusing/binding may be desirable to control internal stress distribution, warpage, mechanical strength performance, and/or elongation performance of the final 3D object 44.

In an example of using the detailing agent 52 to obtain different levels of melting/fusing/binding within the layer 42, the fusing agent 26 may be selectively applied according to the pattern of the cross-section for the layer 42 of the 3D object 44, and the detailing agent 52 may be selectively applied within at least a portion of that cross-section. As such, some examples of the method 100, 200 further comprise selectively applying the detailing agent 52 on the at least some 32 of the remaining build material portion, wherein the detailing agent 52 includes a surfactant, a co-solvent, and water. The evaporative cooling provided by the detailing agent 52 may remove energy from the at least some 32 of the remaining build material portion; however, since the fusing agent 26 is present with the detailing agent 52, fusing is not completely prevented. The level of fusing may be altered due to the evaporative cooling, which may alter the internal stress distribution, warpage, mechanical strength performance, and/or elongation performance of the 3D object 44. It is to be understood that when the detailing agent 52 is applied within the same portion as the fusing agent 26, the detailing agent 52 may be applied in any desirable pattern. When the fusing agent 26 is used, the detailing agent 52 may be applied before, after, or at least substantially simultaneously (e.g., one immediately after the other in a single printing pass, or at the same time) with the fusing agent 26, and then the build material 16 is exposed to radiation.

In another example of using the detailing agent 52 to obtain different levels of melting/fusing/binding within the layer 42, the detailing agent 52 may be applied on the at least some 32 of the remaining build material portion where the energy beam is applied to selectively fuse the at least some 32 of the remaining build material portion. When the energy beam is used, the detailing agent 52 may be applied before the energy beam is selectively applied.

In some examples, whether the fusing agent 26 and radiation exposure or the energy beam is used to form the layer 42, the detailing agent 52 may also or alternatively be applied after the layer 42 is fused to control thermal gradients within the layer 42 and/or the final 3D object 44. In these examples, the thermal gradients may be controlled with the evaporative cooling provided by the detailing agent 52.

In another example that utilizes the evaporative cooling effect of the detailing agent 52, the method 100, 200 further comprises selectively applying the detailing agent 52 on the third portion 36 of the polymeric or polymeric composite build material 16 to prevent the polymeric or polymeric composite build material 16 in the third portion 36 from fusing, wherein the third portion 36 does not include the removable build material portion 34 or the at least some 32 of the remaining build material portion, and the detailing agent 52 includes a surfactant, a co-solvent, and water. The evaporative cooling provided by the detailing agent 52 may remove energy from the third portion 36, which may lower the temperature of the build material 16 in the third portion 36 and prevent the build material 16 in the third portion 36 from fusing.

The detailing agent 52 may also be used to improve the wetting of the anti-coalescing agent 28 on the build material 16. In this example, the method 100, 200 further comprises selectively applying the detailing agent 52 on the some 34' of the polymeric or polymeric composite build material 16 to at least partially facilitate wetting of the anti-coalescing agent 28 on the some 34' of the polymeric or polymeric composite build material 16, wherein the detailing agent 52 includes a surfactant, a co-solvent, and water. The detailing agent 52 may at least partially facilitate the penetration of the anti-coalescing polymer (in the anti-coalescing agent 28) within the void spaces between the build material particles 16 and/or the wetting of the anti-coalescing polymer on the build material particles 16 to form the coating 38. When the detailing agent 52 is applied on the some 34' of the build material 16, the detailing agent 52 and the anti-coalescing agent 28 may be applied at least substantially simultaneously (e.g., one immediately after the other in a single printing pass, or at the same time).

Figure 4:
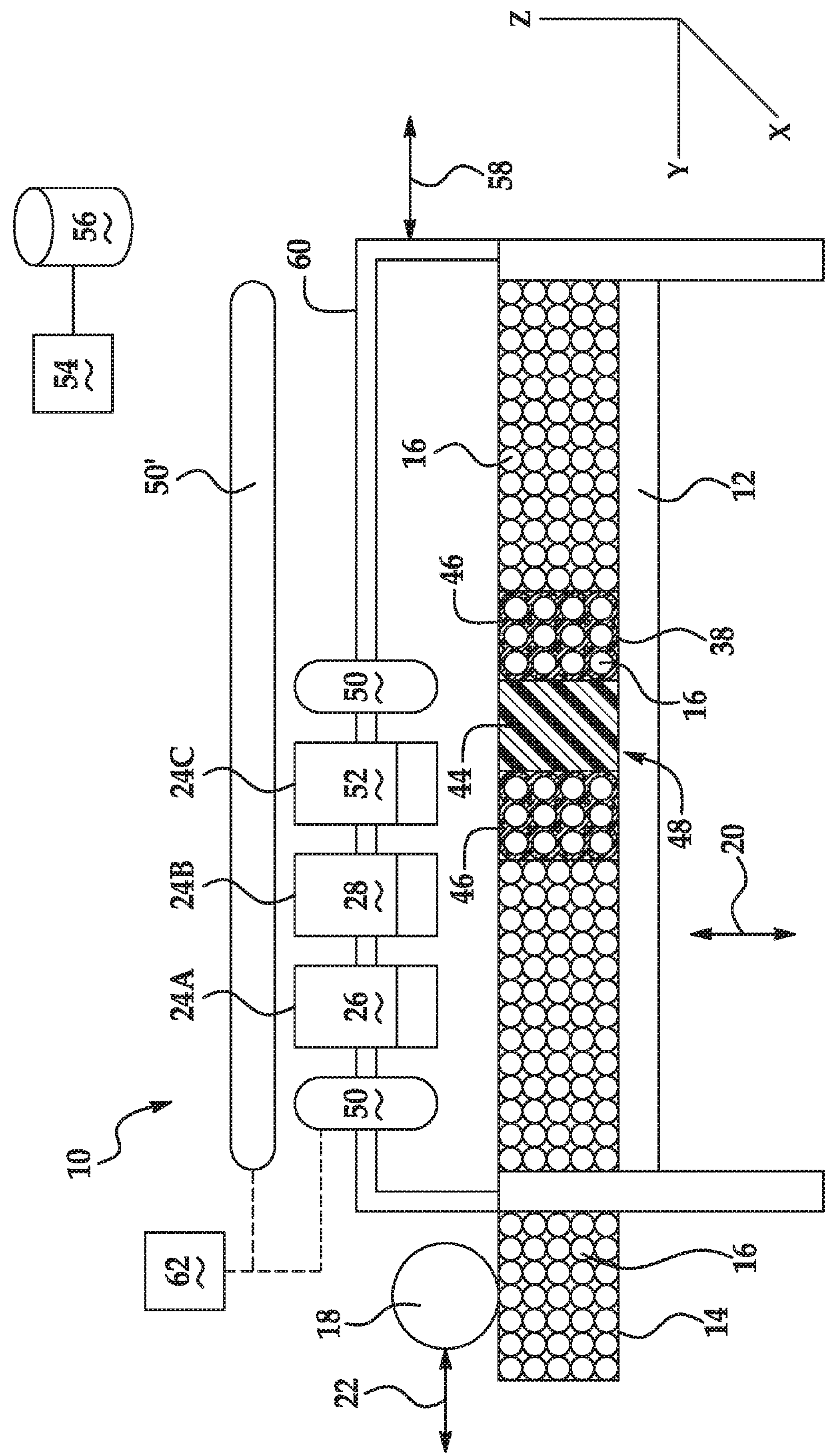
FIG. 4 is a schematic and partially cross-sectional view of an example of a 3D printing system disclosed herein.

Referring now to FIG. 4, an example of a 3D printing system 10 is schematically depicted. It is to be understood that the 3D printing system 10 may include additional components (some of which are described herein) and that some of the components described herein may be removed and/or modified.

Furthermore, components of the 3D printing system 10 depicted in FIG. 4 may not be drawn to scale and thus, the 3D printing system 10 may have a different size and/or configuration other than as shown therein.

In an example, the three-dimensional (3D) printing system 10, comprises: a supply 14 of the polymeric or polymeric composite build material 16; the build material distributor 18; a supply of the anti-coalescing agent 28 comprising: a vehicle, comprising: a co-solvent; a surfactant; a humectant; and water; and an anti-coalescing polymer dispersed in the vehicle, the anti-coalescing polymer having a mean particle size ranging from about 50 nm to about 195 nm; the applicator 24B for selectively dispensing the anti-coalescing agent 28; a source 50, 50' of radiation; a controller 54; and a non-transitory computer readable medium having stored thereon computer executable instructions to cause the controller 54 to: utilize the build material distributor 18 to dispense the polymeric or polymeric composite build material 16; utilize the applicator 24B to selectively dispense anti-coalescing agent 28 to negatively pattern some 34' of the polymeric or polymeric composite build material and to define a removable build material portion 34 and a remaining build material portion; and utilize the source 50, 50' of radiation to form a layer 42 of a final 3D object 44 from at least some 32 of the remaining build material portion, wherein the some 34' of the polymeric or polymeric composite build material 16 in the removable build material portion 34 remains non-coalesced.

As shown in FIG. 4, the printing system 10 includes the build area platform 12, the build material supply 14 containing the build material 16, and the build material distributor 18.

As mentioned above, the build area platform 12 receives the build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material 16 between the build material distributor 18 and the build area platform 12. In some examples, the build material supply 14 may include a surface upon which the build material 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material 16 from a storage location to a position to be spread onto the build area platform 12 or onto a previously formed layer 42 of the final 3D object 44.

As also mentioned above, the build material distributor 18 may be a blade (e.g., a doctor blade), a roller, a combination of a roller and a blade, and/or any other device capable of spreading the build material 16 over the build area platform 12 (e.g., a counter-rotating roller).

As shown in FIG. 4, the printing system 10 also includes the second applicator 24B, which may contain the anti-coalescing agent 28. As also shown in FIG. 4, the printing system 10 may also include the first applicator 24A, which may contain the fusing agent 26 and the third applicator 24C, which may contain the detailing agent 52.

The applicators 24A, 24B, 24C may be scanned across the build area platform 12 in the direction indicated by the arrow 58, e.g., along the y-axis. The applicators 24A, 24B, 24C may be, for instance, thermal inkjet printheads, piezoelectric printheads, continuous inkjet printheads, etc., and may extend a width of the build area platform 12. While each of the applicators 24A, 24B, 24C is shown in FIG. 4 as a single applicator, it is to be understood that each of the applicators 24A, 24B, 24C may include multiple applicators that span the width of the build area platform 12. Additionally, the applicators 24A, 24B, 24C may be positioned in multiple printbars. The applicators 24A, 24B, 24C may also be scanned along the x-axis, for instance, in configurations in which the applicators 24A, 24B, 24C do not span the width of the build area platform 12 to enable the applicators 24A, 24B, 24C to respectively deposit the liquids 26, 28, 52 over a large area of a layer 40 of build material particles 16. The applicators 24A, 24B, 24C may thus be attached to a moving XY stage or a translational carriage 60 that moves the applicators 24A, 24B, 24C adjacent to the build area platform 12 in order to deposit the respective liquids 26, 28, 52 in the respective areas 32, 34, 36 of a layer 40 of the build material particles 16 that has been formed on the build area platform 12 in accordance with the method(s) 100, 200, disclosed herein. The applicators 24A, 24B, 24C may include a plurality of nozzles (not shown) through which the respective liquids 26, 28, 52 are to be ejected.

The applicators 24A, 24B, 24C may deliver drops of the respective liquids 26, 28, 52 at a resolution ranging from about 300 dots per inch (DPI) to about 1200 DPI. In other examples, the applicators 24A, 24B, 24C may deliver drops of the respective liquids 26, 28, 52 at a higher or lower resolution. The drop velocity may range from about 5 m/s to about 24 m/s and the firing frequency may range from about 1 kHz to about 100 kHz. In one example, each drop may be on the order of about 3 picoliters (pl) to about 18 pl, although it is contemplated that a higher or lower drop volume may be used. In some examples, the applicators 24A, 24B, 24C are able to deliver variable size drops of the respective liquids 26, 28, 52. One example of a suitable printhead has 600 DPI resolution and can deliver drop volumes ranging from about 6 pl to about 14 pl.

Each of the previously described physical elements may be operatively connected to a controller 54 of the printing system 10. The controller 54 may process print data that is based on a 3D object model of the final 3D object 44 to be generated. In response to data processing, the controller 54 may control the operations of the build area platform 12, the build material supply 14, the build material distributor 18, and the applicators 24A, 24B, 24C. As an example, the controller 54 may control actuators (not shown) to control various operations of the 3D printing system 10 components. The controller 54 may be a computing device, a semiconductor-based microprocessor, a central processing unit (CPU), an application specific integrated circuit (ASIC), and/or another hardware device. Although not shown, the controller 54 may be connected to the 3D printing system 10 components via communication lines.

The controller 54 manipulates and transforms data, which may be represented as physical (electronic) quantities within the printer's registers and memories, in order to control the physical elements to create the final 3D object 44. As such, the controller 54 is depicted as being in communication with a data store 56. The data store 56 may include data pertaining to a final 3D object 44 to be printed by the 3D printing system 10. The data for the selective delivery of the build material particles 16, the anti-coalescing agent 28, etc. may be derived from a model of the final 3D object 44 to be formed. For instance, the data may include the locations on each layer of build material particles 16 that the second applicator 24B is to deposit the anti-coalescing agent 28. In one example, the controller 54 may use the data to control the second applicator 24B to selectively apply the anti-coalescing agent 28. The data store 56 may also include machine readable instructions (stored on a non-transitory computer readable medium) that are to cause the controller 54 to control the amount of build material particles 16 that is supplied by the build material supply 14, the movement of the build area platform 12, the movement of the build material distributor 18, the movement of the applicators 24A, 24B, 24C, etc.

As shown in FIG. 4, the printing system 10 may also include a source 50, 50' of radiation. In some examples, the source 50' of radiation may be in a fixed position with respect to the build material platform 12. The source 50' in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 50 of radiation may be positioned to apply energy/radiation to the layer 40 of build material particles 16 immediately after the fusing agent 26 has been applied thereto. In the example shown in FIG. 4, the source 50 of radiation is attached to the side of the applicators 24A, 24B, 24C which allows for patterning and heating/exposing to radiation in a single pass.

In still other examples (not shown), the source 50 of radiation may be a laser or other tightly focused energy source that may selectively apply energy to the layer 40 as previously described for SLS. The laser may emit light through optical amplification based on the stimulated emission of radiation. The laser may emit light coherently (i.e., constant phase difference and frequency), which allows the radiation to be emitted in the form of a laser beam that stays narrow over large distances and focuses on a small area. In some example, the laser or other tightly focused energy source may be a pulse laser (i.e., the optical power appears in pluses). Using a pulse laser allows energy to build between pluses, which enable the beam to have more energy. A single laser or multiple lasers may be used.

The source 50, 50' of radiation may emit radiation having wavelengths ranging from about 100 nm to about 1 mm. As one example, the radiation may range from about 800 nm to about 2 μm. As another example, the radiation may be blackbody radiation with a maximum intensity at a wavelength of about 1100 nm. The source 50, 50' of radiation may be infrared (IR) or near-infrared light sources, such as IR or near-IR curing lamps, IR or near-IR light emitting diodes (LED), or lasers with the desirable IR or near-IR electromagnetic wavelengths.

The source 50, 50' of radiation may be operatively connected to a lamp/laser driver, an input/output temperature controller, and temperature sensors, which are collectively shown as radiation system components 62. The radiation system components 62 may operate together to control the source 50, 50' of radiation. The temperature recipe (e.g., radiation exposure rate) may be submitted to the input/output temperature controller. During heating, the temperature sensors may sense the temperature of the build material particles 16, and the temperature measurements may be transmitted to the input/output temperature controller. For example, a thermometer associated with the heated area can provide temperature feedback. The input/output temperature controller may adjust the source 50, 50' of radiation power set points based on any difference between the recipe and the real-time measurements. These power set points are sent to the lamp/laser drivers, which transmit appropriate lamp/laser voltages to the source 50, 50' of radiation. This is one example of the radiation system components 62, and it is to be understood that other radiation source control systems may be used. For example, the controller 54 may be configured to control the source 50, 50' of radiation.

In the examples of the method 100, 200 and the system 10 disclosed herein, the build material particles 16 may be a polymeric build material or a polymeric composite build material. As used herein, the term "polymeric build material" may refer to crystalline or semi-crystalline polymer particles. As used herein, the term "polymeric composite build material" may refer to composite particles made up of polymer and ceramic.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other examples of crystalline or semi-crystalline polymers suitable for use as the build material particles 16 include polyethylene, polypropylene, and polyoxomethylene (i.e., polyacetals). Still other examples of suitable build material particles 16 include polystyrene, polycarbonate, polyester, polyurethanes, other engineering plastics, and blends of any two or more of the polymers listed herein.

Any of the previously listed crystalline or semi-crystalline polymer particles may be combined with ceramic particles to form the polymeric composite build material particles 16. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic particles that may be combined with the crystalline or semi-crystalline polymer particles may depend on the materials used and the final 3D object to be formed. In one example, the ceramic particles may be present in an amount ranging from about 1 wt % to about 40 wt % based on the total weight of the polymeric composite build material particles 16.

In some examples, the polymeric or polymeric composite build material 16 may be in the form of a powder. In other examples, the build material 16 may be in the form of a powder-like material, which includes, for example, short fibers having a length that is greater than its width. In some examples, the powder may be formed from, or may include, short fibers that may, for example, have been cut into short lengths from long strands or threads of material.

The polymeric or polymeric composite build material particles 16 may have a melting point or softening point ranging from about 50° C. to about 400° C. Depending upon the composition of the composite, the melting or softening point may be higher or lower. As an example, the material particles 16 may be a polyamide having a melting point of about 180° C.

The polymeric or polymeric composite build material particles 16 may be made up of similarly sized particles or differently sized particles. In the examples shown herein (FIGS. 2A-2E and FIG. 4), the build material 16 includes similarly sized particles. In an example, the average particle size of the build material particles 16 ranges from about 2 μm to about 200 μm. In another example, the average particle size of the build material particles 16 ranges from about 20 μm to about 90 μm. In still another example, the average particle size of the build material particles 16 is about 60 μm.

In some examples, the polymeric or polymeric composite build material 16 includes, in addition to the polymer particles (and in some cases ceramic particles), an antioxidant, a brightener, a charging agent, a flow aid, or a combination thereof.

Antioxidant(s) may be added to the polymeric or polymeric composite build material 16 to prevent or slow molecular weight decreases of the build material 16 and/or may prevent or slow discoloration (e.g., yellowing) of the build material 16 by preventing or slowing oxidation of the build material 16. In some examples, the antioxidant may be a radical scavenger. In these examples, the antioxidant may include IRGANOX® 1098 (benzenepropanamide, N,N'-1, 6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). In an example, the antioxidant may be included in the polymeric or polymeric composite build material 16 in an amount ranging from about 0.01 wt % to about 5 wt % based on the total weight of the build material 16.

Brightener(s) may be added to the build material 16 to improve visibility. Examples of suitable brighteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), and combinations thereof. In some examples, a stilbene derivative may be used as the brightener. In these examples, the temperature(s) of the 3D printing process may be below a threshold temperature above which the stilbene derivative may become unstable. In an example, the brightener may be included in the polymeric or polymeric composite build material 16 in an amount ranging from about 0.01 wt % to about 10 wt % based on the total weight of the polymeric or polymeric composite build material 16.

Charging agent(s) may be added to the build material 16 to suppress tribo-charging. Examples of suitable charging agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total weight of the polymeric or polymeric composite build material 16.

Flow aid(s) may be added to improve the coating flowability of the build material 16. Flow aids may be particularly beneficial when the particles of the build material 16 are less than 25 μm in size. The flow aid improves the flowability of the polymeric or polymeric composite build material 16 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total weight of the polymeric or polymeric composite build material 16.

Also in some examples of the method 100, 200 and the system 10 disclosed herein, and as mentioned above, a fusing agent 26 may be used. Examples of the fusing agent 26 are dispersions including a radiation absorber (i.e., an active material). The active material may be any infrared light absorbing colorant. In an example, the active material is a near-infrared light absorber. Any near-infrared colorants, e.g., those produced by Fabricolor, Eastman Kodak, or Yamamoto, may be used in the fusing agent 26. As one example, the fusing agent 26 may be a printing liquid formulation including carbon black as the active material. Examples of this printing liquid formulation are commercially known as CM997A, 516458, C18928, C93848, C93808, or the like, all of which are available from HP Inc. Other suitable active materials include near-infrared absorbing dyes or plasmonic resonance absorbers.

As another example, the fusing agent 26 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water soluble near-infrared absorbing dyes selected from the group consisting of:

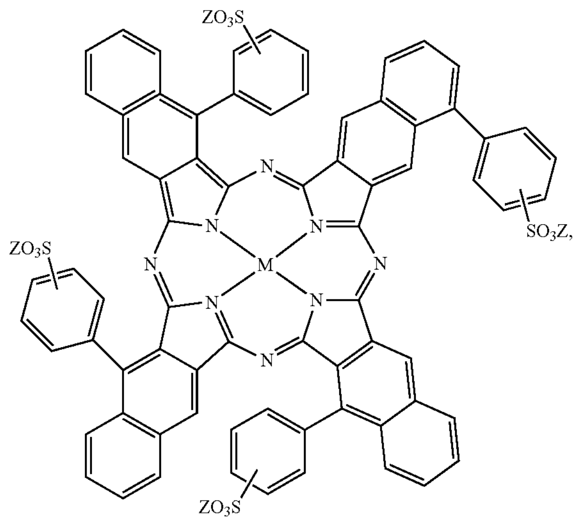

-continued
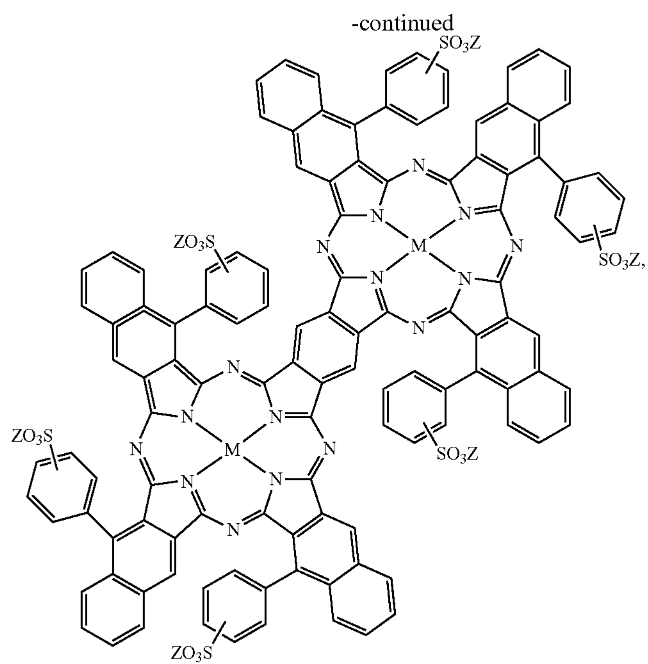
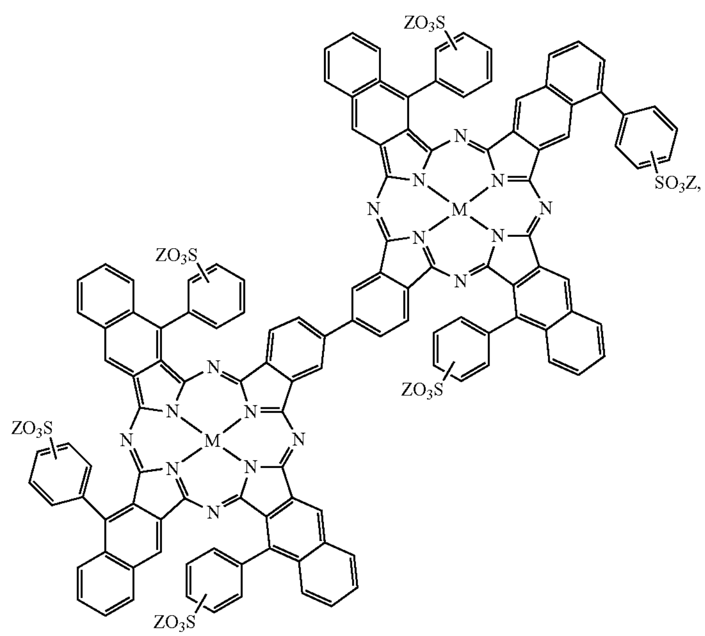

-continued

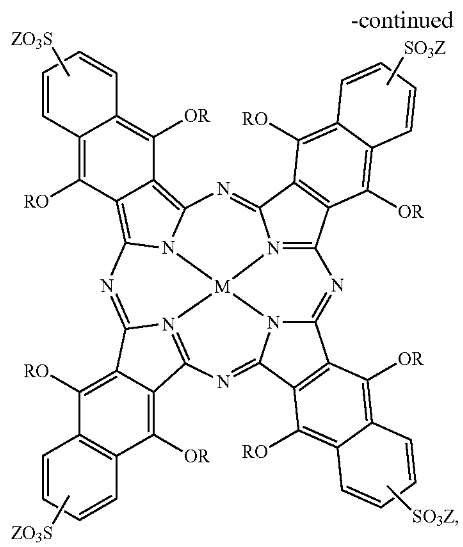

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be any C1-C8 alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

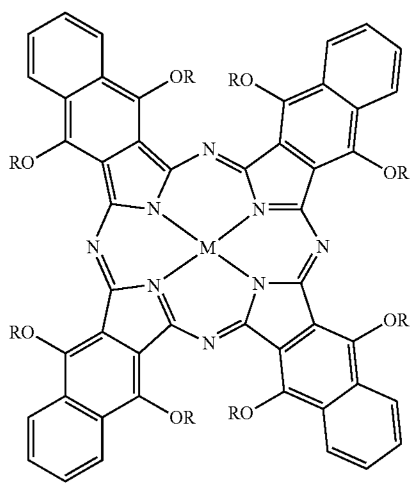

-continued

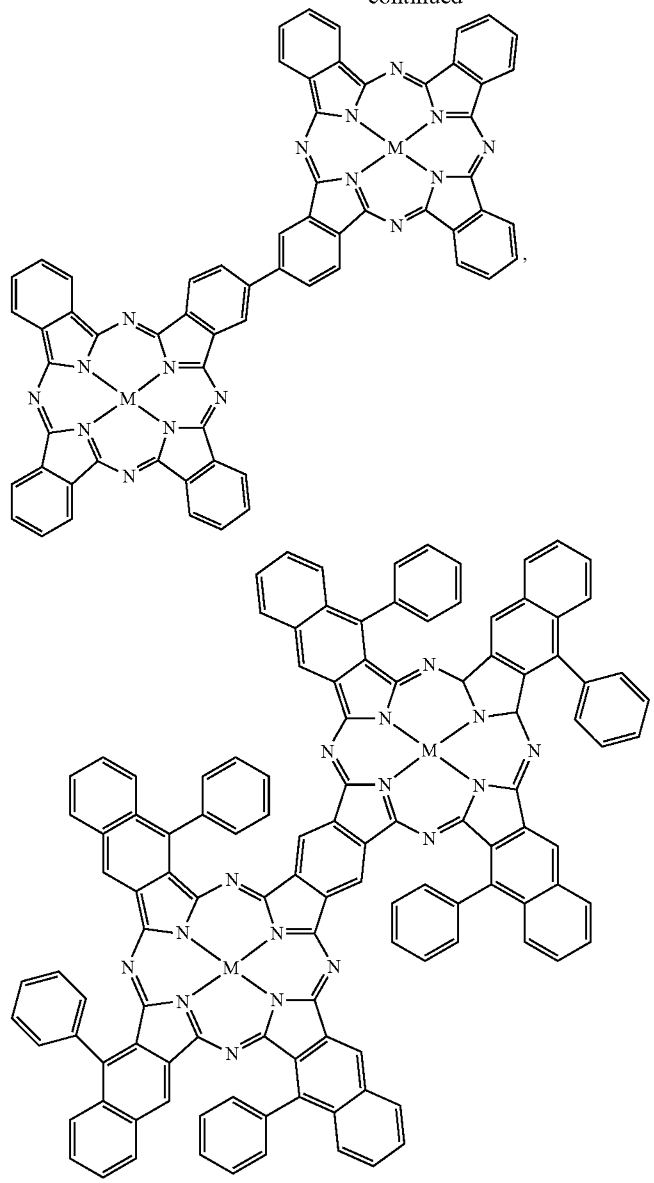

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be any C1-C8 alkyl group (including substituted alkyl and unsubstituted alkyl).

In other examples, the active material may be a plasmonic resonance absorber. The plasmonic resonance absorber allows the fusing agent 26 to absorb radiation at wavelengths ranging from 800 nm to 4000 nm (e.g., at least 80% of radiation having wavelengths ranging from 800 nm to 4000 nm is absorbed), which enables the fusing agent 26 to convert enough radiation to thermal energy so that the polymeric or polymeric composite build material particles 16 fuse. The plasmonic resonance absorber also allows the fusing agent 26 to have transparency at wavelengths ranging from 400 nm to 780 nm (e.g., 20% or less of radiation having wavelengths ranging from 400 nm to 780 nm is absorbed), which enables the final 3D object 44 to be white or slightly colored.

The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO_4$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the active material that is present in the fusing agent 26 ranges from greater than 0 wt % to about 40 wt % based on the total weight of the fusing agent 26. In other examples, the amount of the active material in the fusing agent 26 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the fusing agent 26 having jetting reliability and heat and/or electromagnetic radiation absorbance efficiency.

As used herein, "FA vehicle" may refer to the liquid in which the active material is dispersed or dissolved to form the fusing agent 26. A wide variety of FA vehicles, including aqueous and non-aqueous vehicles, may be used in the fusing agent 26. In some examples, the FA vehicle may include water alone or a non-aqueous solvent alone with no other components. In other examples, the FA vehicle may include other components, depending, in part, upon the first applicator 24A that is to be used to dispense the fusing agent 26. Examples of other suitable fusing agent components include dispersant(s), silane coupling agent(s), co-solvent(s), surfactant(s), antimicrobial agent(s), anti-kogation agent(s), and/or chelating agent(s).

When the active material is the plasmonic resonance absorber, the plasmonic resonance absorber may, in some instances, be dispersed with a dispersant. As such, the dispersant helps to uniformly distribute the plasmonic resonance absorber throughout the fusing agent 26. Examples of suitable dispersants include polymer or small molecule dispersants, charged groups attached to the plasmonic resonance absorber surface, or other suitable dispersants. Some specific examples of suitable dispersants include a water soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent 26 may range from about 10 wt % to about 200 wt % based on the weight of the plasmonic resonance absorber in the fusing agent 26.

When the active material is the plasmonic resonance absorber, a silane coupling agent may also be added to the fusing agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent 26 may range from about 0.1 wt % to about 50 wt % based on the weight of the plasmonic resonance absorber in the fusing agent 26. In an example, the total amount of silane coupling agent(s) in the fusing agent 26 ranges from about 1 wt % to about 30 wt % based on the weight of the plasmonic resonance absorber. In another example, the total amount of silane coupling agent(s) in the fusing agent 26 ranges from about 2.5 wt % to about 25 wt % based on the weight of the plasmonic resonance absorber.

The solvent of the fusing agent 26 may be water or a non-aqueous solvent (e.g., ethanol, acetone, n-methyl pyrrolidone, aliphatic hydrocarbons, etc.). In some examples, the fusing agent 26 consists of the active material and the solvent (without other components). In these examples, the solvent makes up the balance of the fusing agent 26.

The co-solvent(s) that may be used in a water-based fusing agent 26 include any of the co-solvents listed above in reference to the anti-coalescing agent 28. The co-solvent(s) may be present in the fusing agent 26 in a total amount ranging from about 1 wt % to about 50 wt % based upon the total weight of the fusing agent 26, depending upon the jetting architecture of the applicator 24. In an example, the total amount of the co-solvent(s) present in the fusing agent 26 is 25 wt % based on the total weight of the fusing agent 26.

Similar to the anti-coalescing agent 28, the co-solvent(s) of the fusing agent 26 may depend, in part upon the jetting technology that is to be used to dispense the fusing agent 26. For example, if thermal inkjet printheads are to be used, water and/or ethanol and/or other longer chain alcohols (e.g., pentanol) may be the solvent (i.e., makes up 35 wt % or more of the fusing agent 26) or co-solvents. For another example, if piezoelectric inkjet printheads are to be used, water may make up from about 25 wt % to about 30 wt % of the fusing agent 26, and the solvent (i.e., 35 wt % or more of the fusing agent 26) may be ethanol, isopropanol, acetone, etc.

In some examples, the FA vehicle includes surfactant(s) to improve the jettability of the fusing agent 26. Examples of suitable surfactants include the surfactants listed above in reference to the anti-coalescing agent 28. Whether a single surfactant is used or a combination of surfactants is used, the total amount of surfactant(s) in the fusing agent 26 may range from about 0.01 wt % to about 10 wt % based on the total weight of the fusing agent 26. In an example, the total amount of surfactant(s) in the fusing agent 26 may be about 3 wt % based on the total weight of the fusing agent 26.

An anti-kogation agent may be included in the fusing agent 26 that is to be jetted using thermal inkjet printing. Kogation refers to the deposit of dried printing liquid (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent 26 may range from greater than 0.20 wt % to about 0.65 wt % based on the total weight of the fusing agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The FA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent 26 may include a total amount of antimicrobial agents that ranges from about 0.05 wt % to about 1 wt %. In an example, the antimicrobial agent(s) is/are a biocide(s) and is/are present in the fusing agent 26 in an amount of about 0.25 wt % (based on the total weight of the fusing agent 26).

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent 26 may range from greater than 0 wt % to about 2 wt % based on the total weight of the fusing agent 26. In an example, the chelating agent(s) is/are present in the fusing agent 26 in an amount of about 0.04 wt % (based on the total weight of the fusing agent 26).

Also in some examples of the method 100, 200 and the system 10 disclosed herein, and as mentioned above, the detailing agent 52 may be used. The detailing agent 52 may include a surfactant, a co-solvent, and a balance of water. In some examples, the detailing agent 52 consists of these components, and no other components. In some other examples, the detailing agent 52 may further include a colorant. In still some other examples, detailing agent 52 consists of a colorant, a surfactant, a co-solvent, and a balance of water, with no other components. In yet some other examples, the detailing agent 52 may further include additional components, such as anti-kogation agent(s), anti-microbial agent(s), and/or chelating agent(s) (each of which is described above in reference to the fusing agent 26).

The surfactant(s) that may be used in the detailing agent 52 include any of the surfactants listed above in reference to the anti-coalescing agent 28. The total amount of surfactant(s) in the detailing agent 52 may range from about 0.10 wt % to about 5.00 wt % with respect to the total weight of the detailing agent 52.

The co-solvent(s) that may be used in the detailing agent 52 include any of the co-solvents listed above in reference to the anti-coalescing agent 28. The total amount of co-solvent(s) in the detailing agent 52 may range from about 1.00 wt % to about 20.00 wt % with respect to the total weight of the detailing agent 52.

Similar to the anti-coalescing agent 28 and the fusing agent 26, the co-solvent(s) of the detailing agent 52 may depend, in part upon the jetting technology that is to be used to dispense the detailing agent 52. For example, if thermal inkjet printheads are to be used, water and/or ethanol and/or other longer chain alcohols (e.g., pentanol) may make up 35 wt % or more of the detailing agent 52. For another example, if piezoelectric inkjet printheads are to be used, water may make up from about 25 wt % to about 30 wt % of the detailing agent 52, and 35 wt % or more of the detailing agent 52 may be ethanol, isopropanol, acetone, etc.

When the detailing agent 52 includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye is also capable of absorbing radiation with wavelengths of 650 nm or less. As such, the dye absorbs at least some wavelengths within the visible spectrum, but absorbs little or no wavelengths within the near-infrared spectrum. This is in contrast to the active material in the fusing agent 26, which absorbs wavelengths within the near-infrared spectrum. As such, the colorant in the detailing agent 52 will not substantially absorb the fusing radiation, and thus will not initiate melting and fusing of the polymeric or polymeric composite build material 16 in contact therewith when the layer 40 is exposed to the fusing radiation.

The dye selected as the colorant in the detailing agent 52 may also have a high diffusivity (i.e., it may penetrate into greater than 10 μm and up to 100 μm of the build material particles 16). The high diffusivity enables the dye to penetrate into the build material particles 16 upon which the detailing agent 52 is applied, and also enables the dye to spread into portions of the build material 16 that are adjacent to the portions of the build material 16 upon which the detailing agent 52 is applied. The dye penetrates deep into the build material particles 16 to dye/color the particles 16. When the detailing agent 52 is applied at or just outside the edge boundary 33 (of the final 3D object 44), the build material particles 16 at the edge boundary 33 may be colored. In some examples, at least some of these dyed build material particles 16 may be present at the edge(s) or surface(s) of the formed 3D layer or object, which prevents or reduces any patterns (due to the different colors of the fusing agent 26 and the polymeric or polymeric composite build material 16) from forming at the edge(s) or surface(s).

The dye in the detailing agent 52 may be selected so that its color matches the color of the active material in the fusing agent 26. As examples, the dye may be any azo dye having sodium or potassium counter ion(s) or any diazo (i.e., double azo) dye having sodium or potassium counter ion(s), where the color of azo or dye azo dye matches the color of the fusing agent 26.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

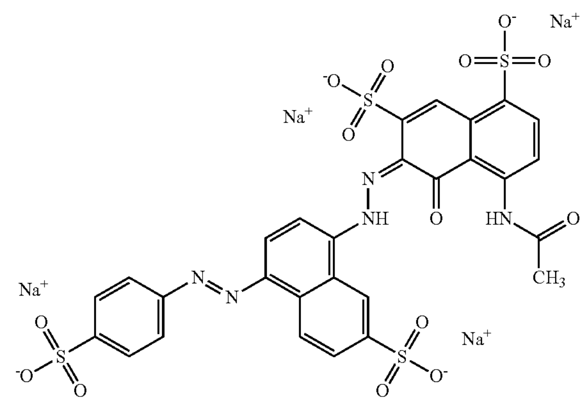

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

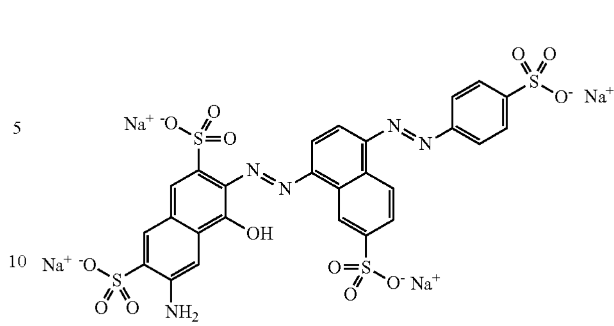

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

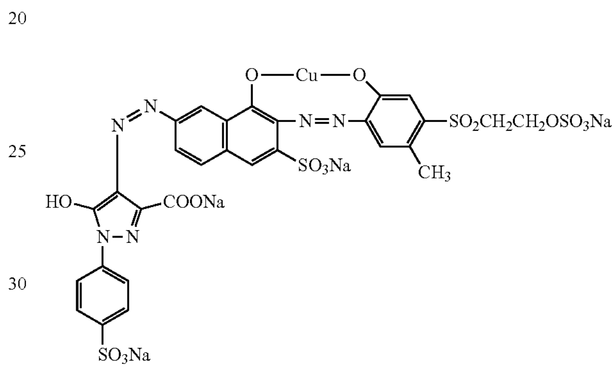

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

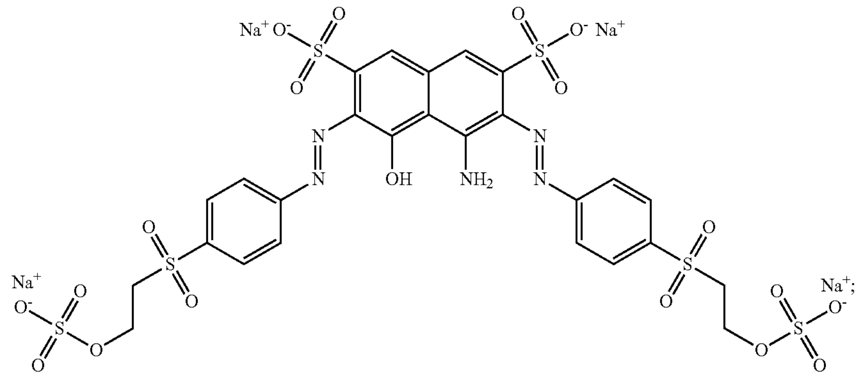
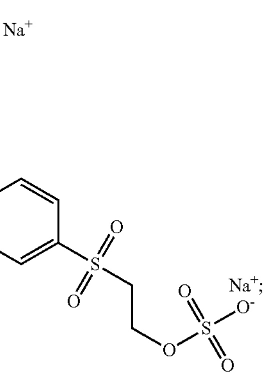

and combinations thereof. Some other commercially available examples of the dye used in the detailing agent 52 include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent 52 may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D object.

Some examples of the other dye include a salt, such as a sodium salt, an ammonium salt, or a potassium salt. Some specific examples include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

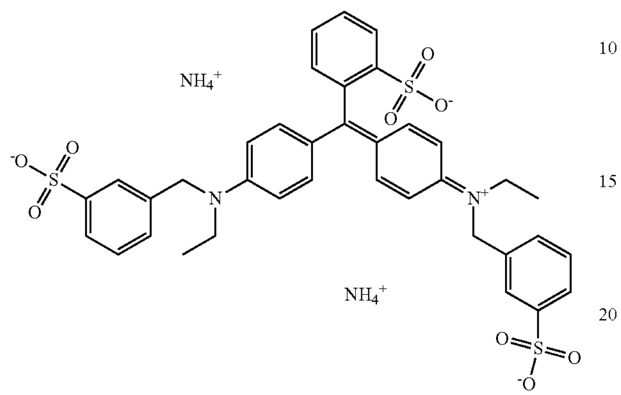

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

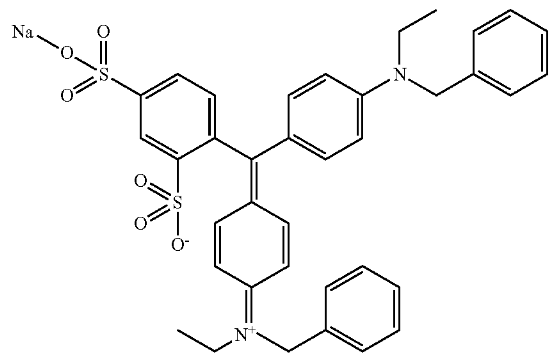

(commercially available as Acid Blue 7); and a phthalocyanine with a chemical structure of:

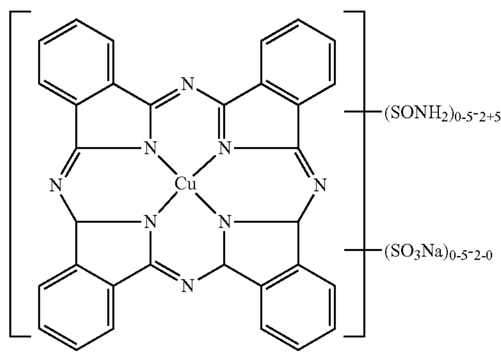

(commercially available as Direct Blue 199); and combinations thereof.

In an example of the detailing agent 52, the dye may be present in an amount ranging from about 1.00 wt % to about 3.00 wt % based on the total weight of the detailing agent 52. In another example of the detailing agent 52 including a combination of dyes, one dye (e.g., the black dye) is present in an amount ranging from about 1.50 wt % to about 1.75 wt % based on the total weight of the detailing agent 52, and the other dye (e.g., the cyan dye) is present in an amount ranging from about 0.25 wt % to about 0.50 wt % based on the total weight of the detailing agent 52.

The balance of the detailing agent 52 is water. As such, the amount of water may vary depending upon the amounts of the other components that are included.

To further illustrate the present disclosure, examples are given herein. It is to be understood these examples are provided for illustrative purposes and are not to be construed as limiting the scope of the present disclosure.

EXAMPLES

Example 1

Examples of the anti-coalescing agent (ACA) were prepared. The example anti-coalescing agents included perfluoroalkoxy alkane, poly(tetrafluoroethylene), or perfluorinated polyether as the anti-coalescing polymer. The general formulations of the example anti-coalescing agents are shown below in Table 1, with the wt % of each component that was used.

TABLE 1

| Ingredient | Specific component | E.g. ACA 1 (wt %) | E.g. ACA 2 (wt %) | E.g. ACA 3 (wt %) |
|---|---|---|---|---|
| Anti-coalescing polymer | Perfluoroalkoxy alkane | 3-10 | — | — |
| | Poly(tetrafluoroethylene) | — | 3-10 | — |
| | Perfluorinated polyether | — | — | 3-10 |
| Co-solvent | 2-pyrrolidone | 5-15 | 5-15 | 5-15 |
| | Triethylene glycol | 5-10 | 5-10 | 5-10 |
| Surfactant | TERGITOL ™ TMN-6 | 0.5-1 | 0.5-1 | 0.5-1 |
| | TERGITOL ™ 15-S-30 | 0.25-1 | 0.25-1 | 0.25-1 |
| | TEGO ® Wet 510 | 0.25-1 | 0.25-1 | 0.25-1 |
| | DOWFAX ™ 2A1 | 0.1-1 | 0.1-1 | 0.1-1 |
| Humectant | LIPONIC ® EG-1 | 3-8 | 3-8 | 3-8 |
| Water | Deionized water | Balance | Balance | Balance |

The formulations for the example anti-coalescing agents in Table 1 are suitable for being printed via thermal inkjet printheads. It is believed that formulations for piezoelectric printheads may include different amounts and/or different components.

Example 2

Six tin pans of polyamide 12 (PA 12) powder were prepared. Perfluoroalkoxy alkane (dispersed in water), an example anti-coalescing polymer, was applied on a portion of the polyamide 12 powder in the first tin pan. Poly (tetrafluoroethylene) (dispersed in water), another example anti-coalescing polymer, was applied on a portion of the polyamide 12 powder in the second tin pan. One of the example anti-coalescing agents, ACA 1, was applied on a portion of the polyamide 12 powder in the third tin pan.

Polyethylene wax (LIQUILUBE™ 405 available from Lubrizol Corp.), a comparative anti-coalescing polymer, was applied on a portion of the polyamide 12 powder in the fourth tin pan. Tetrafluoroethylene hexafluoropropylene vinylidene fluoride (dispersed in water), another comparative anti-coalescing polymer, was applied on a portion of the polyamide 12 powder in the fifth tin pan. The sixth tin pan of polyamide 12 powder was not treated.

Each of the tin pans was heated in an oven to about 200° C. (i.e., about 15° C. above the melting temperature of polyamide 12 powder). After 1 hour in the oven at 200° C., the non-treated polyamide 12 powder in each of the six tin pans was melted. After 1 hour in the oven at 200° C., the portions of the polyamide 12 powder treated with the comparative anti-coalescing polymers also melted. In contrast, after 1 hour in the oven at 200° C., the portions of the polyamide 12 powder treated with the example anti-coalescing polymers were each a cake of powder that was easily broken apart and removed from the melted portions.

Example 3

One of the example anti-coalescing agents from Example 1, ACA 1, was mixed with polyamide 12 powder at a weight ratio of 1:1. An about 200 μm thick layer of the mixture was deposited on a glass slide to form an example removable build material portion. An about 200 μm thick layer of the polyamide 12 powder alone (i.e., without any liquids or agents) was deposited on anther glass slide to form a comparative portion. Each glass slide with the layer thereon was heated to 210° C. on a stage that enabled controlled heating of the layers and observation of the layers under a microscope.

Figures 5A, 5B:
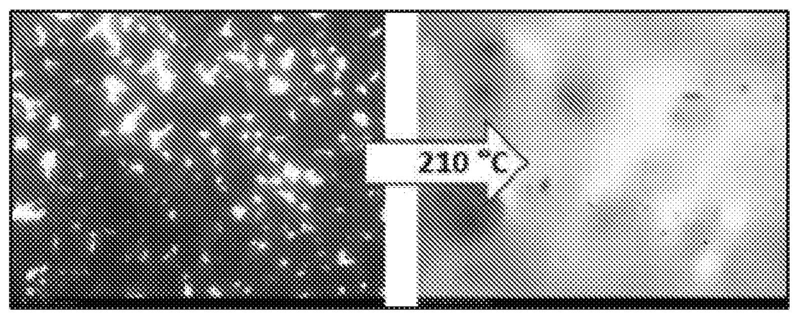
FIGS. 5A through 5D are magnified images, at 100 times magnification, of an example removable build material portion and a comparative portion before and after heating.
Figures 5C, 5D:
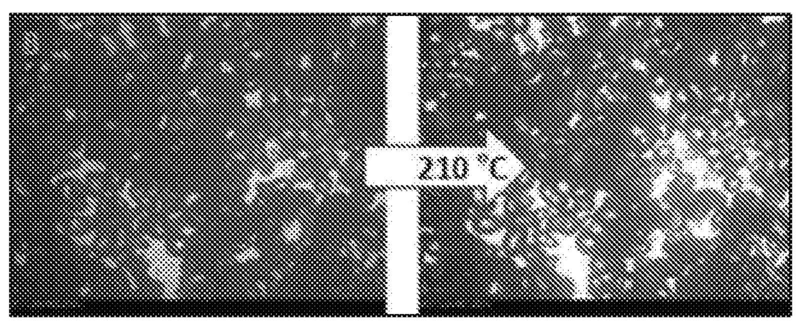

FIG. 5A shows the comparative portion, at 100 times magnification, before it was heated to 210° C., and FIG. 5B shows the comparative portion, at 100 times magnification, after it was heated to 210° C. As shown in FIG. 5B, the comparative portion melted/coalesced to form a polymer film. FIG. 5C shows the example removable build material portion, at 100 times magnification, before it was heated to 210° C., and FIG. 5D shows the example removable build material portion, at 100 times magnification, after it was heated to 210° C. As shown in FIG. 5D, the powder particles in the example removable build material portion remained distinct particles and did not coalesce. As also shown in FIG. 5D, the powder particles appeared to become more translucent.

Example 4

One of the example anti-coalescing agents from Example 1, ACA 1, was used to print three example 3D objects. The build material was polyamide 12 powder, and the fusing agent included carbon black as the active material.

In each layer of the first example 3D object, the fusing agent was applied on a solid rectangle of the build material powder. Then, the example anti-coalescing agent was applied in a pattern to form a series of 1 cm by 2 mm strips along one side of the rectangle (to which the fusing agent was applied). A comparative anti-coalescing agent, having the same formulation as the example anti-coalescing agent except that the comparative anti-coalescing agent did not include an anti-coalescing polymer, was applied in a pattern to form another series of 1 cm by 2 mm strips along the other side of the rectangle (to which the fusing agent was applied). On each side of the rectangle, the agent was applied in the first strip in an amount of 5 g/m$^2$, in the second strip in an amount of 10 g/m$^2$, in the third strip in an amount of 15 g/m$^2$, in the fourth strip in an amount of 20 g/m$^2$, in the fifth strip in an amount of 25 g/m$^2$, in the sixth strip in an amount of 30 g/m$^2$, in the seventh strip in an amount of 35 g/m$^2$, and in the eighth strip in an amount of 40 g/m$^2$. Then, radiation was applied to fuse each layer.

The comparative anti-coalescing agent did affect the coalescence of the build material powder, but the same amount of the example anti-coalescing agent improved the prevention of the coalescence of the build material powder (as compared to the prevention of the coalescence of the build material powder achieved with the same amount of the comparative anti-coalescing agent). All of the strips, to which the comparative anti-coalescing agent was applied, at least partially coalesced. In contrast, the eighth strip, to which 40 g/m$^2$ of the example anti-coalescing agent was applied, did not coalesce, and almost all of the seventh strip, to which 35 g/m$^2$ of the example anti-coalescing agent was applied, did not coalesce.

In each layer of the second example 3D object, the fusing agent was applied on a solid rectangle of the build material powder. Then, the example anti-coalescing agent was applied in a pattern to form in eight cylinders with a 1 mm diameter and eight cylinders with a 2 mm diameter within the rectangle (to which the fusing agent was applied). The example anti-coalescing agent was applied to the first two 1 mm diameter cylinders and the first two 2 mm diameter cylinders in an amount of 10 g/m$^2$, to the second two 1 mm diameter cylinders and the second two 2 mm diameter cylinders in an amount of 20 g/m$^2$, to the third two 1 mm diameter cylinders and the third two 2 mm diameter cylinders in an amount of 30 g/m$^2$, and to the fourth two 1 mm diameter cylinders and the fourth two 2 mm diameter cylinders in an amount of 40 g/m$^2$. Then, radiation was applied to fuse each layer.

A comparative 3D object was printed in the same way, except that the comparative anti-coalescing agent (having the same formulation as the example anti-coalescing agent except that the comparative anti-coalescing agent did not include an anti-coalescing polymer), and not the example anti-coalescing agent, was applied in the pattern to form the eight cylinders with a 1 mm diameter and the eight cylinders with a 2 mm diameter within the rectangle (to which the fusing agent was applied). The amounts of comparative anti-coalescing agent applied to the cylinders in the comparative 3D object were the same as the amounts of example anti-coalescing agent applied to the cylinders in the second example 3D object.

Figure 6A:
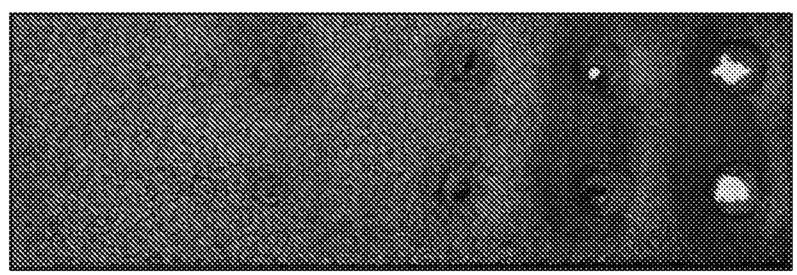
FIGS. 6A and 6B are black and white photos of an example 3D object and a comparative 3D object.
Figure 6B:
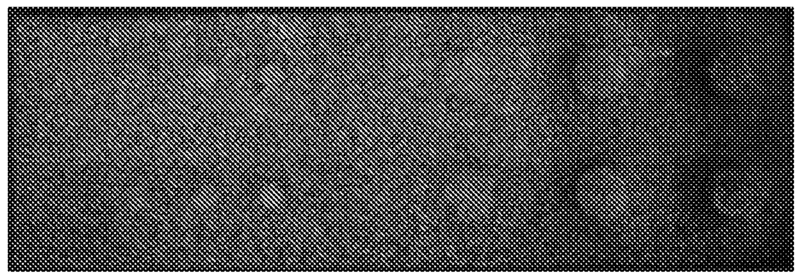

FIG. 6A shows the second example 3D object after standard post processing, and FIG. 6B shows the comparative 3D object after standard post processing. Standard post processing for each of the second example 3D object and the comparative 3D object included bead blasting. As shown in FIGS. 6A and 6B, the example anti-coalescing agent improved the prevention of the coalescence of the build material powder (as compared to the prevention of the coalescence of the build material powder achieved with the same amount of the comparative anti-coalescing agent).

None of the cylinders, to which the comparative anti-coalescing agent was applied, were able to be even partially cleared. Further, applying the comparative anti-coalescing agent at 40 g/m$^2$ resulted in a similar degree of fusion as applying the comparative anti-coalescing agent at 10 g/m$^2$.

In contrast, both of the 2 mm diameter cylinders, to which 40 g/m$^2$ of the example anti-coalescing agent was applied, were able to be cleared, and both of the 2 mm diameter cylinders, to which 30 g/m$^2$ of the example anti-coalescing agent was applied, had a low degree of fusion and were able to be partially cleared. While the 1 mm diameter cylinders were not able to be cleared, it is believed that if the fusing agent was not applied or if less of the fusing agent was applied to the 1 mm diameter cylinders, the example anti-coalescing agent may have been able to prevent the coalescence of the build material powder within the 1 mm diameter cylinders such that they could have been cleared.

The third example 3D object was printed to form a plate with ten sets of two vertical titles separated by a small gap (i.e., ten gaps were created). The first two gaps had a thickness of 0.1 mm, the second two gaps had a thickness of 0.2 mm, the third two gaps had a thickness of 0.3 mm, the fourth two gaps had a thickness of 0.4 mm, and the fifth two gaps had a thickness of 0.5 mm. The example anti-coalescing agent was applied in one gap of each thickness, and the comparative anti-coalescing agent (having the same formulation as the example anti-coalescing agent except that the comparative anti-coalescing agent did not include an anti-coalescing polymer) was applied in the other gap of each thickness. The third example 3D object was printed several times in each of a default orientation and an orientation rotated 180 degrees from the default orientation so that results were not affected by any temperature non-uniformity in the printbed.

The example anti-coalescing agent improved the prevention of the coalescence of the build material powder (as compared to the prevention of the coalescence of the build material powder achieved with the same amount of the comparative anti-coalescing agent). The comparative anti-coalescing agent was able to reliably clear the 0.5 mm gap such that the vertical titles could be separated after printing and was able to intermittently clear the 0.4 mm gap depending on the location of the 0.4 mm gap in the printbed. In contrast, the example anti-coalescing agent was able to reliably clear the 0.3 mm gap regardless of the location of the 0.3 mm gap in the printbed.

It is to be understood that the ranges provided herein include the stated range and any value or sub-range within the stated range. For example, from about 3 wt % to about 10 wt % should be interpreted to include not only the explicitly recited limits of from about 3 wt % to about 10 wt %, but also to include individual values, such as about 4 wt %, about 5.1 wt %, about 7.25 wt %, about 8.85 wt %, about 9.5 wt %, etc., and sub-ranges, such as from about 3.5 wt % to about 7.35 wt %, from about 3.15 wt % to about 9.5 wt %, from about 5 wt % to about 8.5 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An anti-coalescing agent for a three-dimensional (3D) printing process, comprising:
- a vehicle, comprising:
  - a co-solvent;
  - a surfactant including:
    - a first non-ionic surfactant having a first hydrophilic chain length;
    - a second non-ionic surfactant having a second hydrophilic chain length that is different than the first hydrophilic chain length;
    - a third non-ionic surfactant, wherein the third non-ionic surfactant is selected from the group consisting of a polyether siloxane and an alkoxylated alcohol; and
    - an anionic surfactant;
  - a humectant; and
  - water; and
- an anti-coalescing polymer dispersed in the vehicle, the anti-coalescing polymer having a mean particle size ranging from about 50 nm to about 195 nm, and the anti-coalescing polymer to coat polymeric build material particles to prevent the polymeric build material particles from coalescing during electromagnetic radiation exposure of the 3D printing process.

2. The anti-coalescing agent as defined in claim 1 wherein the anti-coalescing polymer is a perfluorinated polymer.

3. The anti-coalescing agent as defined in claim 2 wherein the perfluorinated polymer is selected from the group consisting of a perfluoroalkoxy alkane, poly(tetrafluoroethylene), a perfluorinated polyether, fluorinated ethylene propylene, and combinations thereof.

4. The anti-coalescing agent as defined in claim 1 wherein the anti-coalescing agent has a surface tension ranging from about 20 dynes/cm to about 28 dynes/cm.

5. The anti-coalescing agent as defined in claim 1, wherein:
- the first non-ionic surfactant is present in an amount ranging from about 0.1 wt % to about 1 wt %;
- the second non-ionic surfactant is present in an amount ranging from about 0.1 wt % to about 1 wt %;
- the third non-ionic surfactant is present in an amount ranging from about 0.1 wt % to about 1 wt %; and
- the anionic surfactant is present in an amount ranging from about 0.1 wt % to about 1 wt %.

6. A method for three-dimensional (3D) printing, comprising:
- applying a polymeric or polymeric composite build material;
- negatively patterning some of the polymeric or polymeric composite build material to define a removable build material portion and a remaining build material portion, the negatively patterning including selectively applying an anti-coalescing agent comprising:
  - a vehicle, comprising:
    - a co-solvent;
    - a surfactant;
    - a humectant; and
    - water; and
  - an anti-coalescing polymer dispersed in the vehicle, the anti-coalescing polymer having a mean particle size ranging from about 50 nm to about 195 nm; and
- based on a 3D object model, forming a layer of a final 3D object from at least some of the remaining build material portion, wherein the some of the polymeric or polymeric composite build material in the removable build material portion remains non-coalesced.

7. The method as defined in claim 6 wherein the anti-coalescing polymer is a perfluorinated polymer selected from the group consisting of a perfluoroalkoxy alkane, poly(tetrafluoroethylene), a perfluorinated polyether, fluorinated ethylene propylene, and combinations thereof.

8. The method as defined in claim 6 wherein the forming of the layer involves:

based on the 3D object model, selectively applying a fusing agent on the at least some of the remaining build material portion; and exposing the polymeric or polymeric composite build material to radiation to fuse the at least some of the remaining build material portion.

9. The method as defined in claim 8, further comprising selectively applying a detailing agent on the at least some of the remaining build material portion to control a fusing temperature in the remaining build material portion, wherein the detailing agent includes a surfactant, a co-solvent, and water.

10. The method as defined in claim 6 wherein the forming of the layer involves selectively laser sintering, based on the 3D object model, the at least some of the remaining build material portion.

11. The method as defined in claim 6, further comprising selectively applying a detailing agent on the some of the polymeric or polymeric composite build material to at least partially facilitate wetting of the anti-coalescing agent on the some of the polymeric or polymeric composite build material, wherein the detailing agent includes a surfactant, a co-solvent, and water.

12. The method as defined in claim 6, further comprising selectively applying a detailing agent on a third portion of the polymeric or polymeric composite build material to prevent the polymeric or polymeric composite build material in the third portion from fusing, wherein the third portion does not include the removable build material portion or the at least some of the remaining build material portion, and the detailing agent includes a surfactant, a co-solvent, and water.

13. The method as defined in claim 6 wherein the removable build material portion is located outside of an edge of the remaining build material portion or is at least partially surrounded by the remaining build material portion.

14. A three-dimensional (3D) printed article, comprising:

a fused polymer or polymer composite object; and a removable object in contact with at least a portion of the fused polymer or polymer composite object, the removable object comprising:

unfused polymeric or polymeric composite build material particles; and a polymeric coating formed on surfaces of the unfused polymeric or polymeric composite build material particles and present in voids between the polymeric or polymeric composite build material particles, wherein the polymeric coating is a perfluorinated polymer.

15. The 3D printed article as defined in claim 14 wherein the perfluorinated polymer is selected from the group consisting of a perfluoroalkoxy alkane, poly(tetrafluoroethylene), a perfluorinated polyether, fluorinated ethylene propylene, and combinations thereof.

* * * * *